United States Patent
Okagaki et al.

(10) Patent No.: US 12,203,648 B2
(45) Date of Patent: *Jan. 21, 2025

(54) LIGHTING DEVICE, AIR CONDITIONER, AND CONTROL SYSTEM

(71) Applicant: Mitsubishi Electric Corporation, Tokyo (JP)

(72) Inventors: Satoru Okagaki, Tokyo (JP); Yusuke Fujii, Tokyo (JP); Haruka Suzuki, Tokyo (JP); Muneharu Kuwata, Tokyo (JP); Kuniko Kojima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/243,673

(22) Filed: Sep. 8, 2023

(65) Prior Publication Data

US 2023/0417406 A1 Dec. 28, 2023

Related U.S. Application Data

(62) Division of application No. 17/916,586, filed as application No. PCT/JP2020/016143 on Apr. 10, 2020.

(51) Int. Cl.
*F21V 8/00* (2006.01)
*F21S 8/00* (2006.01)
(Continued)

(52) U.S. Cl.
CPC .......... *F21V 33/0092* (2013.01); *F24F 13/20* (2013.01); *G02B 6/0066* (2013.01); *F21S 8/006* (2013.01); *F21V 14/06* (2013.01)

(58) Field of Classification Search
CPC . F21V 9/02; F21V 14/04; F21V 14/06; F21V 14/08; G02B 6/0051; G02B 6/0055; F21Y 2105/16; F21S 6/008
See application file for complete search history.

(56) References Cited

U.S. PATENT DOCUMENTS 7,654,721 B2 2/2010 Okada
2007/0285921 A1* 12/2007 Zulim ................... F21V 23/04
362/240
(Continued)

FOREIGN PATENT DOCUMENTS

DE 43 27 629 A1 4/1994
FR 3 082 956 A1 12/2019
(Continued)

OTHER PUBLICATIONS

International Search Report and Written Opinion mailed on Jun. 30, 2020, received for PCT Application PCT/JP2020/016143, filed on Apr. 10, 2020, 9 pages.
(Continued)

*Primary Examiner* — Alexander K Garlen
(74) *Attorney, Agent, or Firm* — XSENSUS LLP

(57) ABSTRACT

An air conditioner includes a housing including an illumination opening at a position viewable by a user; a blower provided in an airflow path connecting an inlet and outlet; a light emitter provided in the housing viewable through the illumination opening and including a light incident portion to receive light emitted from a first light source and a first light emission portion to emit first light generated from the light and including light simulating natural light; and at least one light extractor emitting second light that is part of the light received by the light emitter that reaches an edge portion of the light emitter without being emitted as the first light or second light received from the first light source or a second light source different from the first light source without intervention of the light emitter. The at least one light extractor is provided in the airflow path.

15 Claims, 15 Drawing Sheets

(51) Int. Cl.
    *F21V 14/06*    (2006.01)
    *F21V 33/00*    (2006.01)
    *F24F 13/20*    (2006.01)

(56) References Cited

U.S. PATENT DOCUMENTS

| | | | |
|---|---|---|---|
| 2008/0186726 A1 | 8/2008 | Okada | |
| 2008/0273323 A1* | 11/2008 | Ladstaetter | F21V 7/0016 362/231 |
| 2009/0298406 A1 | 12/2009 | Norbury, Jr. et al. | |
| 2013/0003360 A1* | 1/2013 | Igaki | F21V 31/03 362/249.02 |
| 2013/0100174 A1 | 4/2013 | Yamada et al. | |
| 2014/0071673 A1* | 3/2014 | Gould | F21V 23/009 362/235 |
| 2014/0160736 A1* | 6/2014 | Chung | F21V 7/0016 362/249.02 |
| 2015/0022996 A1 | 1/2015 | Kang | |
| 2016/0062029 A1 | 3/2016 | Hsiao | |
| 2016/0273723 A1 | 9/2016 | Van Gheluwe et al. | |
| 2017/0138553 A1* | 5/2017 | Ferrari | F21V 5/002 |
| 2017/0303357 A1* | 10/2017 | Miller | H05B 45/00 |
| 2018/0059474 A1 | 3/2018 | Yamauchi | |
| 2018/0259140 A1* | 9/2018 | Keller | F21S 8/006 |
| 2018/0274752 A1 | 9/2018 | Takeshita et al. | |
| 2018/0283655 A1 | 10/2018 | Yamauchi et al. | |
| 2019/0072288 A1 | 3/2019 | Niemiec et al. | |
| 2021/0108781 A1* | 4/2021 | Peng | F21V 23/04 |
| 2021/0180765 A1* | 6/2021 | Stolte | G02B 6/0018 |
| 2021/0190279 A1 | 6/2021 | Fujii et al. | |
| 2022/0196904 A1 | 6/2022 | Fujii et al. | |
| 2022/0221130 A1 | 7/2022 | Okagaki et al. | |
| 2022/0244448 A1 | 8/2022 | Fujii et al. | |

FOREIGN PATENT DOCUMENTS

| | | | |
|---|---|---|---|
| JP | 59-29533 | A | 2/1984 |
| JP | 59-29633 | U | 2/1984 |
| JP | 64-13621 | A | 1/1989 |
| JP | 3-27526 | U | 3/1991 |
| JP | 3-213922 | A | 9/1991 |
| JP | 2004-306713 | A | 11/2004 |
| JP | 2008-186786 | A | 8/2008 |
| JP | 2013-92616 | A | 5/2013 |
| JP | 2014-222296 | A | 11/2014 |
| JP | 6081663 | B2 | 2/2017 |
| JP | 2018-37243 | A | 3/2018 |
| JP | 2018-170123 | A | 11/2018 |
| JP | 2018-170125 | A | 11/2018 |
| KR | 10-2010-0037420 | A | 4/2010 |
| KR | 2014-0039703 | A | 4/2014 |
| WO | 2014/097805 | A1 | 6/2014 |
| WO | 2019-212025 | A1 | 11/2019 |
| WO | 2019/220656 | A1 | 11/2019 |
| WO | 2020/175523 | A1 | 9/2020 |
| WO | 2020/240664 | A1 | 12/2020 |
| WO | 2020/240933 | A1 | 12/2020 |

OTHER PUBLICATIONS

Japanese Office Action issued Apr. 18, 2023, in counterpart Japanese Patent Application No. 2022-514288, 10 pp.
Extended European Search Report issued Jul. 17, 2023, in corresponding European Patent Application No. 20930588.7, 7pp.
Notice of Reasons for Refusal mailed Oct. 3, 2023, in Japanese Application No. 2023-007204, 10 pages.

* cited by examiner

LIGHTING DEVICE, AIR CONDITIONER, AND CONTROL SYSTEM

CROSS-REFERENCE TO RELATED APPLICATIONS

The present application is a divisional of U.S. patent application Ser. No. 17/916,586, filed Oct. 3, 2022, which is based on PCT filing PCT/JP2020/016143, filed Apr. 10, 2020. This application is also related to U.S. Ser. No. 17/612,223, entitled: ILLUMINATION DEVICE, filed on: Nov. 18, 2021, U.S. Ser. No. 17/612,229, entitled: DIFFUSER AND LIGHTING DEVICE, filed on: Nov. 18, 2021, and U.S. Ser. No. 17/432,097, entitled: LIGHTING DEVICE, WINDOW WITH A LIGHTING FUNCTION, AND BUILDING PRODUCT FOR A WINDOW, filed on: Aug. 19, 2021, the entire contents of each are incorporated herein by reference.

TECHNICAL FIELD

The present disclosure relates to lighting devices, air conditioners, and control systems using them.

BACKGROUND ART

There is a lighting technique that improves the spaciousness of a space by emitting light simulating a sky, such as a blue sky, from a main surface to make it look like a window (see, e.g., Patent Literature 1).

Also, as an integrated combination of a lighting device and an air conditioner, there is disclosed, in, for example, Patent Literature 2, an example of a circulator including a lighting device.

CITATION LIST

Patent Literature

Patent Literature 1: International Publication No. 2019/220656
Patent Literature 2: Japanese Utility Model Publication No. 59-029633

SUMMARY OF INVENTION

Technical Problem

However, although the lighting technique described in Patent Literature 1 is perceived by an observer as if it were a window, it is still insufficient in providing a more natural view, such as a change in shape of sunlight due to wind from outside or with time.

Also, although the circulator with the lighting device described in Patent Literature 2 integrates an air circulation function and a lighting function, it discloses nothing about integrating an air circulation function and a lighting function for the purpose of providing a more natural view and a specific method therefor.

Thus, the present disclosure is intended to provide a lighting device, an air conditioner, and a control system that improve the spaciousness of a space in which an observer is present.

Solution to Problem

An aspect of an air conditioner according to the present disclosure includes: a housing including an inlet and an outlet, and an illumination opening at a position viewable by a user in an installed state; a blower provided in an airflow path connecting the inlet and the outlet; a first light source provided in the housing; a light emitter provided at a position in the housing viewable through the illumination opening, the light emitter including a light incident portion to receive light emitted from the first light source and a first light emission portion to emit first light generated from light emitted from the first light source and including light simulating natural light; and at least one light extractor provided at at least one position around the light emitter in the housing, the at least one light extractor emitting second light that is part of the light received by the light emitter that reaches an edge portion of the light emitter without being emitted as the first light or second light received from the first light source or a second light source different from the first light source without intervention of the light emitter, toward a space that is outside the housing and faces the illumination opening, wherein the at least one light extractor is provided in the airflow path.

Also, an aspect of a lighting device according to the present disclosure includes a first light source; a light emitter including a light incident portion to receive light emitted from the first light source and a first light emission portion to emit first light generated from the light and including light simulating natural light; and at least one light extractor provided at at least one position in an edge portion of the light emitter or around the light emitter, the at least one light extractor emitting second light that is part of the light received by the light emitter that reaches an edge portion of the light emitter without being emitted as the first light or second light received from the first light source or a second light source different from the first light source without intervention of the light emitter, toward a space that faces a surface of the light emitter in which the first light emission portion is formed.

A control system according to the present disclosure includes: the above air conditioner or lighting device; and a controller to control light emission states of the light emitter and the at least one light extractor of the air conditioner or the lighting device.

Advantageous Effects of Invention

According to the present disclosure, it is possible to provide a lighting device, an air conditioner, and a control system that improve the spaciousness of a space.

DESCRIPTION OF EMBODIMENTS

First Embodiment

Figure 1:
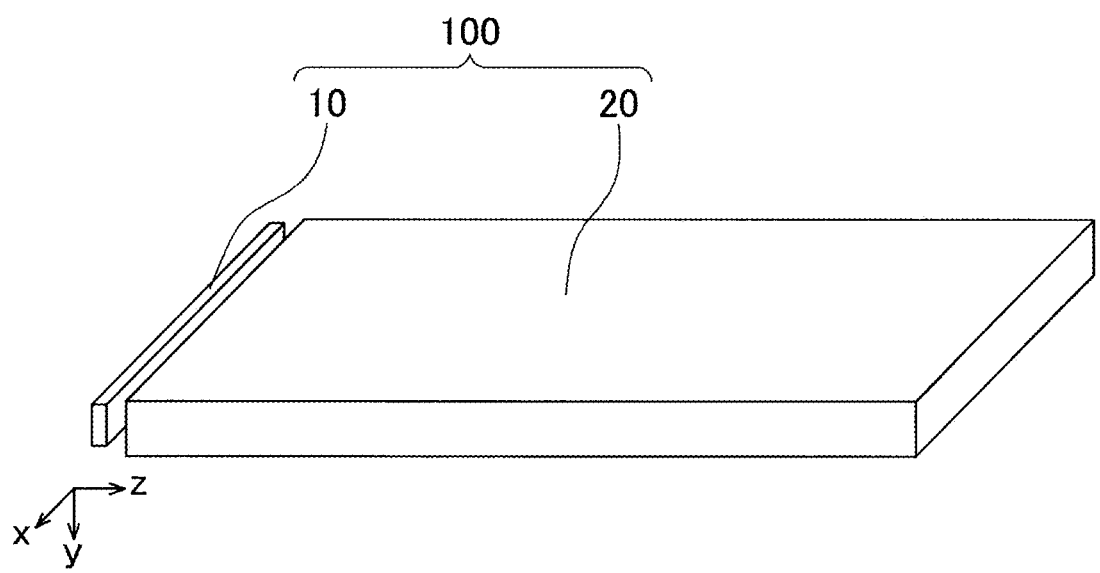
FIG. 1 is a perspective view illustrating a schematic configuration of a lighting unit.

Hereinafter, embodiments of lighting devices, air conditioners, and control systems according to the present disclosure will be described with reference to the drawings. The following embodiments are merely examples, and it is possible to combine embodiments as appropriate and to modify each embodiment as appropriate.

In each drawing described below, elements may be shown on different scales. Also, in each embodiment described below, to facilitate explanation, coordinate axes of an xyz orthogonal coordinate system may be shown in drawings. In this case, a main emission direction that is a direction in which first light is emitted is taken as the +y axis direction. Here, the first light refers to light, such as scattered light simulating the sky, that a lighting device of interest is intended to mainly emit. Moreover, in the case of an edge-lit type light emitter to be described later, a traveling direction of incident light is taken as +z axis direction.

Here, the main emission direction can be replaced with a normal direction of a main light emitting surface of the lighting device. The main light emitting surface refers to a particularly designated surface of one or more light emission surfaces of the lighting device or a light emitter provided in the lighting device. More specifically, the main light emitting surface should be a surface that is one of one or more light emission surfaces of the lighting device or a light emitter provided in the lighting device and is particularly intended to be seen by an observer as a light emitting surface from which the first light is emitted. In the case of a lighting device that simulates a window, the main light emitting surface may be, for example, a surface whose normal direction is directed toward a room interior when it is installed as a window.

For example, when the light emitter provided in the lighting device has a plate shape, the main light emitting surface may be one of two surfaces connected by side surface(s). Also, hereinafter, in the shape, the two surfaces connected by the side surface(s) may be referred to as main surfaces, and the side surface(s) of the plate shape, i.e., surface(s) forming edge surface(s) of the main surfaces in the plate shape may be referred to simply as edge surface(s) or side surface(s).

Also, for example, when the light emitter provided in the lighting device has a rod shape, the main light emitting surface may be one of side surface(s) of the column body or a partial region of the side surface(s) of the column body. Here, the rod shape refers to a shape of a column body having two bases connected by one or more side surfaces. Rod is a general term for column bodies. Hereinafter, in the rod shape, the one or more side surfaces connected by the bases may be referred to as main surface(s), and the bases of the column body, i.e., surfaces forming edge surfaces of the main surface(s) in the rod shape, may be referred to simply as edge surfaces or side surfaces.

The main light emitting surface is not limited to a flat surface, and may, for example, include a curved surface or an inclined surface. That is, the main light emitting surface may be curved or inclined, or may have a surface shape obtained by combining two or more of a flat surface, a curved surface, and an inclined surface. Also, when the main light emitting surface includes a curved surface or an inclined surface, the normal direction of the main light emitting surface may be a normal direction of a central portion or a normal direction of a tangent plane. Also, when the main light emitting surface does not have a specific normal direction, such as in the case of a cylindrical shape, a normal direction at an arbitrary position of the main light emitting surface may be taken as the main emission direction.

First Embodiment

A first embodiment will be described below with reference to the drawings.

An example of a lighting unit provided in a lighting device with a blowing function, an air conditioner, and a control system according to the present disclosure will be described first.

<Example of Lighting Unit 100>

Figure 2:
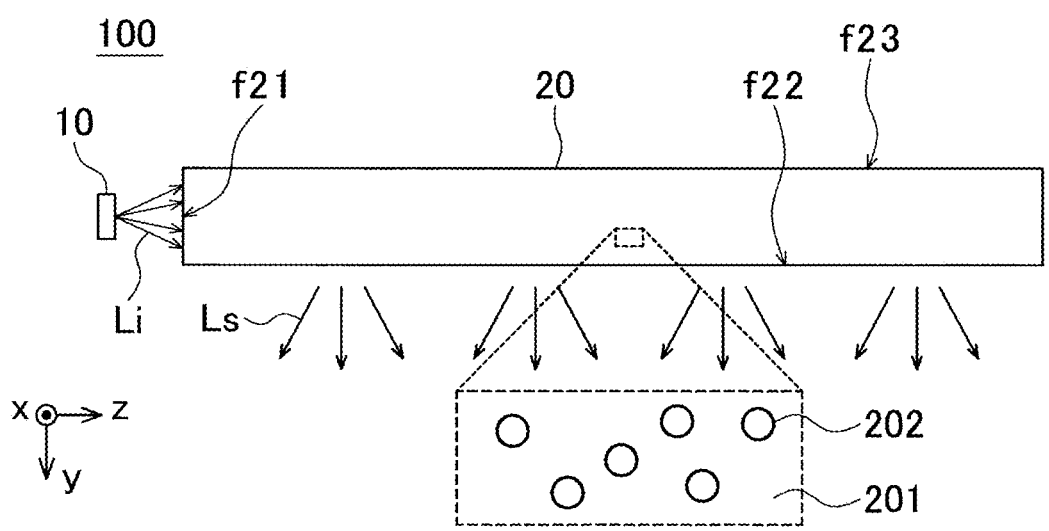
FIG. 2 is a cross-sectional view illustrating a schematic configuration of the lighting unit.

FIGS. 1 and 2 are schematic configuration diagrams illustrating an example of a lighting unit 100 according to the first embodiment. FIG. 1 is a perspective view illustrating a schematic configuration of the lighting unit 100, and FIG. 2 is a cross-sectional view illustrating the schematic configuration of the lighting unit 100.

The lighting unit 100 includes one or more light sources 10 and a diffuser 20. In the present disclosure, the diffuser 20 and the one or more light sources 10 paired with the diffuser 20 are referred to collectively as the lighting unit 100. That is, the lighting unit 100 is a pair of the light source(s) 10 and diffuser 20. Although the illustration is omitted, the lighting unit 100 may include a frame that supports the light source(s) 10 and diffuser 20.

For convenience of explanation, the following description assumes that the y axis direction is a thickness direction (up-down direction) of the diffuser 20, the z axis direction is a lateral direction (left-right direction), and the x axis direction is a longitudinal direction (front-rear direction). However, the above directions do not necessarily coincide with directions in an actual installed state.

In the example illustrated in FIG. 2, the main light emitting surface is a surface f22. The main light emitting surface may be a partial region of the surface f22. Also, the main light emitting surface may be formed on the surface f22. Hereinafter, when the main light emitting surface is formed in a partial region of a surface, the region may be referred to as a main light emitting region, and a region opposite thereto may be referred to as a back side region.

Hereinafter, light incident on an edge surface of the diffuser 20 may be referred to as light Li. Also, first light (in this example, scattered light simulating the sky) emitted from the diffuser 20 may be referred to as light Ls. Also, hereinafter, light guided in the diffuser 20 may be referred to as light Lt or transmitted light Lt. Here, "guiding light" refers to transmitting light entering a medium, along a predetermined optical path in the medium. Thus, light Lt does not include light scattered or absorbed in the diffuser 20.

As described later, in the diffuser 20, the number of emission surfaces through which light Ls is emitted is not limited to one. For example, light Ls can be emitted also through a surface f23 opposite the surface f22.

<<Light Source 10>>

Figure 3A:
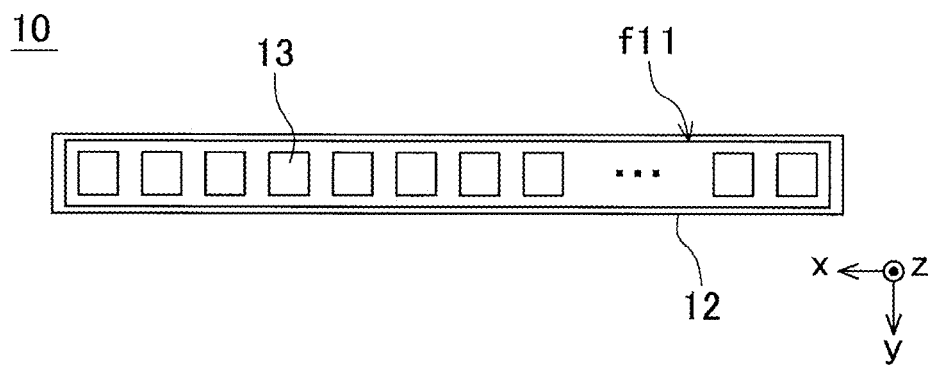
FIGS. 3A and 3B are configuration diagrams illustrating a schematic configuration of a light source provided in the lighting unit.
Figure 3B:
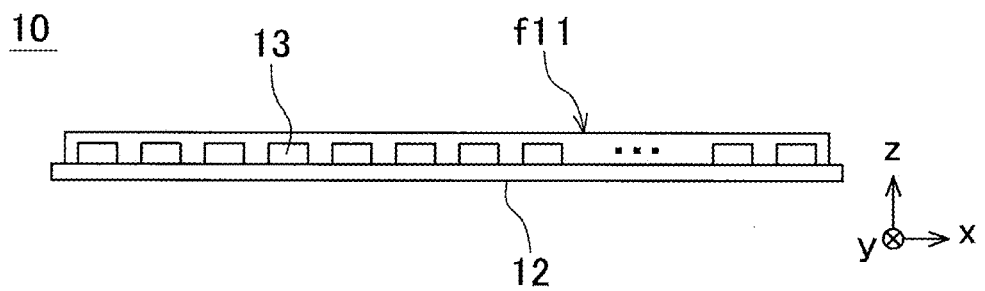
Figure 4:
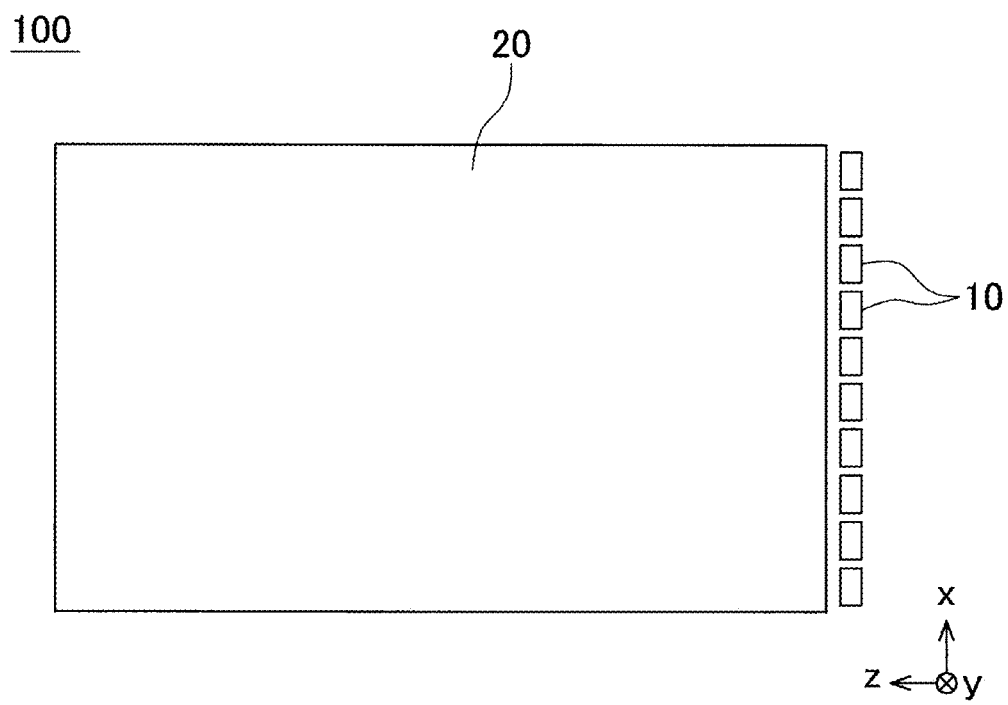
FIG. 4 is a configuration diagram illustrating an arrangement example of light sources provided in the lighting unit.

FIGS. 3A and 3B are configuration diagrams illustrating a schematic configuration of a light source provided in the lighting unit 100. Also, FIG. 4 is a configuration diagram illustrating an arrangement example of light sources provided in the lighting unit 100. The light source(s) 10 may be, for example, LED light source(s). Each light source 10 may include a substrate 12 and one or more LED elements 13, as illustrated in FIGS. 3A and 3B. In the example illustrated in FIGS. 3A and 3B, multiple LED elements 13 are provided. Also, the LED element(s) 13 are arranged on the substrate 12. Here, the LED element(s) are an example of light emitting element(s). The light emitting element(s) are not limited to LED element(s), and may be, for example, laser light emitting element(s), fluorescent tube(s), or the like.

Each light source 10 is provided to face an edge surface of the diffuser 20 forming an edge portion of the surface f22 in which the main light emitting surface is formed. For example, each light source 10 includes a light emitting surface f11 that emits light Li that is incident on the diffuser 20, and is disposed so that the light emitting surface f11 faces an edge surface of the diffuser 20 forming an edge portion of the surface f22 in which the main light emitting surface is formed.

As illustrated in FIG. 4, the lighting unit 100 may include multiple light sources 10 for one diffuser 20. Here, it is assumed that a unit of light source(s) 10 is a unit for which on/off control, emitted light amount control, or emitted light color control can be independently performed. The lighting unit 100 may include only one light source 10 for one diffuser 20.

Hereinafter, a group of light sources or light emitting elements (which may be one light source or one light emitting element) that emits, to one diffuser 20, incident light for generating light Ls may be referred to collectively as the light source(s) 10. Also, although the function of the light source(s) that emit light Li will be described below with the light source(s) 10 as a subject, the function can be taken as the function of one light source or one light emitting element included in the lighting unit 100, or taken as the function of a combination of multiple light sources or multiple light emitting elements.

As an example, in the configuration example of a light source 10 illustrated in FIGS. 3A and 3B, it is possible to consider each LED element 13 in the drawing as one light source 10. In this case, it is possible that one of the light sources 10 corresponding to the respective LED elements 13 in the drawing has the configuration of the light source 10 illustrated in FIGS. 3A and 3B (i.e., a configuration including multiple LED elements 13). Also, in the arrangement example of the light sources 10 illustrated in FIG. 4, it is possible to consider each light source 10 in the drawing as one LED element 13.

The light source(s) 10 emit light Li that is incident light on the diffuser 20. The light source(s) 10 emit white light as light Li, for example. Also, the light source(s) 10 may emit, as light Li, light having a predetermined correlated color temperature Tci, for example.

The correlated color temperature Tci is, for example, 6500 K. Also, the correlated color temperature Tci is, for example, 5000 K. The correlated color temperatures of lights emitted by the respective light sources 10 may be the same or different.

The color of light Li emitted from the light source(s) may be a color other than white. For example, the lighting unit 100 may include, as the light source(s) 10, a white light source and a green light source. Also, the lighting unit 100 may include, as the light source(s) 10, a white light source, a green light source, and an orange light source. Also, the lighting unit 100 may include, as the light source(s) 10, white light sources having different color temperatures. For example, the lighting unit 100 may include, as the light source(s) 10, a white light source having a high color temperature and a white light source having a low color temperature.

Here, the difference in color temperature between the white color having the high color temperature and the white color having the low color temperature is, for example, 8800 K. The correlated color temperature of the white color having the high color temperature is, for example, 14400 K. The correlated color temperature of the white color having the high color temperature is, for example, 11500 K or higher. Also, the correlated color temperature of the white color having the high color temperature is, for example, 19000 K or lower. The correlated color temperature of the white color having the low color temperature is, for example, 5600 K. The correlated color temperature of the white color having the low color temperature is, for example, 5500 K or higher. Also, the correlated color temperature of the white color having the low color temperature is, for example, 6050 K or lower.

The light source(s) 10 not only may be disposed to face one edge surface forming the edge portion of the surface f22 in which the main light emitting surface is formed, as illustrated in FIG. 4, but also may be disposed to face two or more edge surfaces forming the edge portion of the surface f22, for example.

For example, the light source(s) 10 (more specifically, the light emitting surface(s) f11 thereof) may be disposed to face at least one of one or more edge surfaces of the diffuser 20 forming the edge portion of the surface f22 in which the main light emitting surface is formed. Also, for example, multiple light sources 10 may be disposed along at least one of the one or more edge surfaces of the diffuser 20 forming the edge portion of the surface f22 in which the main light emitting surface is formed. Also, as described later, the lighting unit 100 may be configured such that light is received through a back surface (surface f23) of the diffuser 20 and light Ls is emitted through a front surface (surface f22). In this case, the light source(s) 10 may be disposed to face the back surface of the diffuser 20. Hereinafter, regardless of the position(s) of the light source(s) 10, any that acts as a light source that causes light Li to be incident on one diffuser 20 is considered as a light source 10 of this embodiment.

Figure 5:
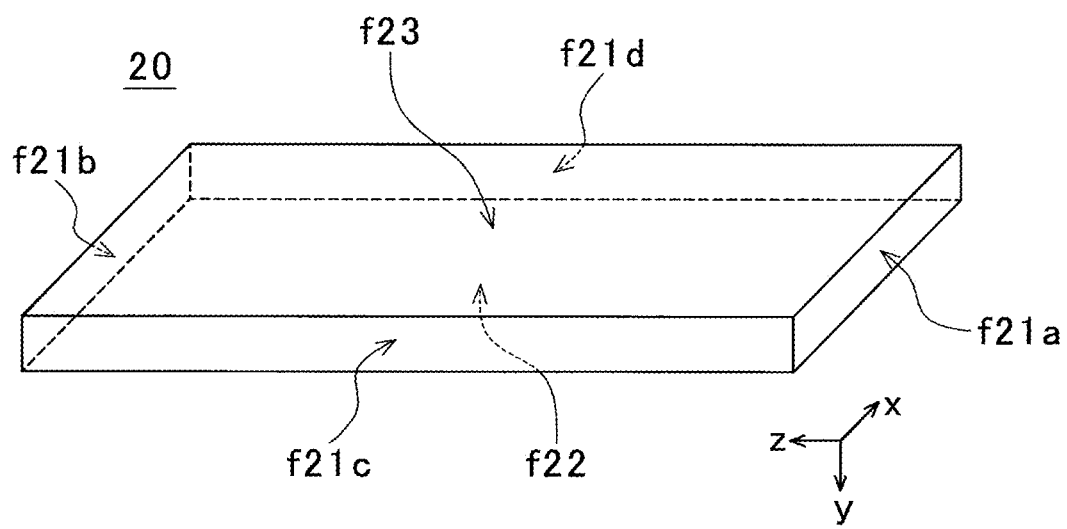
FIG. 5 is a perspective view illustrating an example of a shape of a diffuser provided in the lighting unit.
Figure 6:
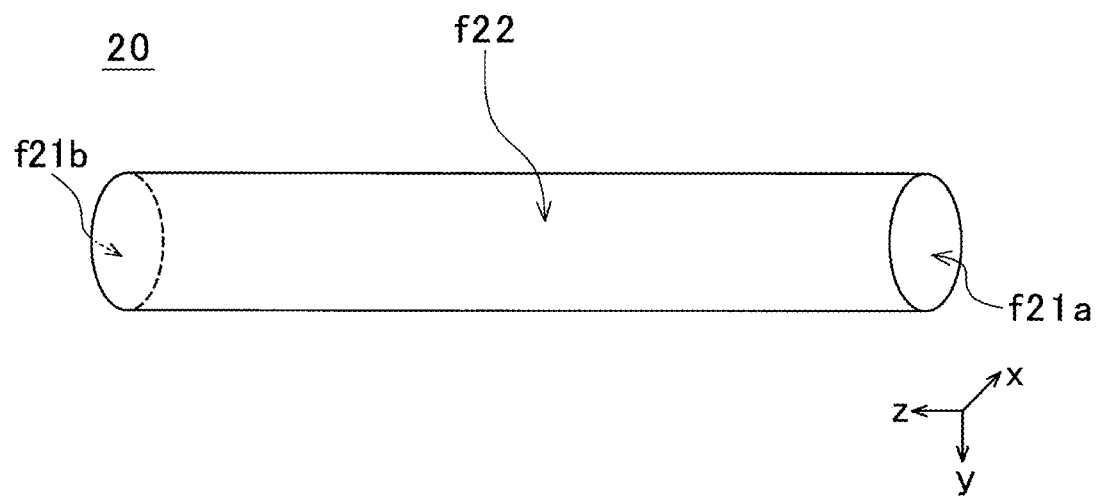
FIG. 6 is a perspective view illustrating another example of the shape of the diffuser provided in the lighting unit.

FIGS. 5 and 6 are perspective views each illustrating an example of a shape of the diffuser 20. For example, when the diffuser 20 has a rectangular plate shape as illustrated in FIG. 5, and includes four side surfaces (surfaces f21a, f21b, f21c, and f21d in the drawing) and two main surfaces (surfaces f22 and f23 in the drawing) connected by the four side surfaces, the light source(s) 10 may be disposed as follows.

As an example, the light source(s) 10 may be disposed to face the edge surface f21a of the diffuser 20. In this case, multiple light sources 10 may be disposed along the edge surface f21a of the diffuser 20. Also, as an example, the light source(s) 10 may be disposed to face the edge surfaces f21a and f21b of the diffuser 20. In this case, multiple light sources 10 may be disposed along the edge surfaces f21a and f21b of the diffuser 20. Also, as an example, the light source(s) 10 may be disposed to face the edge surfaces f21a, f21b, and f21c of the diffuser 20. In this case, multiple light sources 10 may be disposed along the edge surfaces f21a, f21b, and f21c of the diffuser 20. Also, as an example, the light sources 10 may be disposed to face the side surface f21a and the edge surfaces f21b, f21c, and f21d of the diffuser 20. In this case, multiple light sources 10 may be disposed along the edge surfaces f21a, f21b, f21c, and f21d of the diffuser 20.

Also, as an example, the light source(s) 10 may be disposed to face at least one of the edge surfaces f21a, f21b, f21c, and f21d of the diffuser 20. In this case, multiple light sources 10 may be disposed along the at least one of the edge surfaces f21a, f21b, f21c, and f21d of the diffuser 20.

The shape of the diffuser 20 is not limited to a rectangular plate shape. When the shape of the diffuser 20 is another shape, it is possible to apply the above positional relationship between the edge surfaces and the light source(s) to a certain edge surface while replacing it with another edge surface opposite the certain edge surface, another edge surface adjacent to the certain edge surface, or the like, for example. Also, it is possible to apply the above positional relationship between the edge surfaces and the light source(s) to a certain partial region of a continuous side surface while replacing it with another partial region located opposite the certain partial region, another partial region located adjacent to the certain partial region, or the like, for example.

Also, for example, when the diffuser 20 has the main light emitting surface formed on a side surface (main surface f22 in the drawing) of a rod shape connected by two bases (edge surfaces f21a and f21b in the drawing) as illustrated in FIG. 6, the light source(s) 10 may be disposed as follows.

As an example, the light source(s) 10 may be disposed to face the edge surface f21a of the diffuser 20. In this case, only one light source 10 or multiple light sources 10 may be disposed for the edge surface f21a of the diffuser 20. For example, multiple light sources 10 may be disposed along an outer circumference shape of the edge surface f21a or disposed uniformly in the surface. Also, as an example, the light source(s) 10 may be disposed to face the edge surfaces f21a and f21b of the diffuser 20. In this case, only one light source 10 or multiple light sources 10 may be disposed for each of the edge surfaces f21a and f21b of the diffuser 20. For example, for each of the edge surfaces f21a and f21b, multiple light sources 10 may be disposed along an outer circumference shape of the edge surface or disposed uniformly in the edge surface.

Also, for example, in view of zero energy building (ZEB), light obtained by guiding external light (such as sunlight) may be used instead of light Li from the light source(s) 10. In guiding external light, it is possible to use a daylighting member and/or a light guide for introducing external light and emitting it in a predetermined direction. The lighting unit 100 may include, as a light source 10, such a daylighting member and/or a light guide.

<<Diffuser 20>>

Next, the diffuser 20 will be described with reference to the drawings. In this example, light Li from the light source(s) 10 is incident on an edge portion of the surface f22 of the diffuser 20 in the +z axis direction, and light Ls generated due to the scattering effect of the diffuser 20 is emitted through the surface f22, thereby allowing the diffuser 20 to be seen as a light emitter that emits light close to that from the natural sky. The diffuser 20 is an example of a light emitter provided in the lighting device. Hereinafter, the diffuser 20 serving as a light emitter that emits desired first light may be referred to simply as a light emitter 20 or light emitting panel 20. The light emitting panel 20 need not necessarily be plate-shaped.

The diffuser 20 includes a light incident surface that receives light Li, and a light emission surface (more specifically, the main light emitting surface) that emits light Ls, which is the first light. In this example, the surface f22, which is a first surface, corresponds to the light emission surface (in particular, the main light emitting surface), and a surface f21 that is an edge surface of the surface f22 in which the main light emitting surface is formed corresponds to the light incident surface. Also, the diffuser 20 may further include, opposite the first surface, the surface f23, which is a second surface.

The main light emitting surface may be a partial region of the first surface. Also, the main light emitting surface may be formed on the first surface. Also, the light incident surface may be a partial region of the surface f21 that is an edge surface of the surface f22. Also, the light incident surface may be formed on the edge surface. Hereinafter, the first surface may be referred to as the front surface f22, and the second surface opposite thereto may be referred to as the back surface f23. Also, the edge surface may be referred to as the side surface f21.

The diffuser 20 receives light Li emitted by the light source(s) 10. Also, the diffuser 20 guides the received light Li. Also, the diffuser 20 guides the received light Li as light Lt. Also, the diffuser 20 emits light Ls while guiding light Lt.

Figure 7:
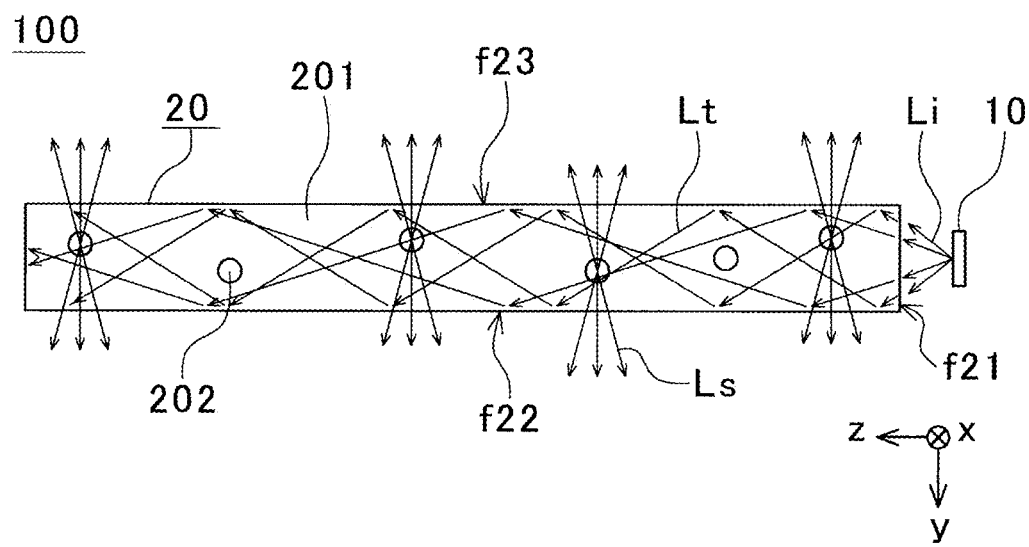
FIG. 7 is an explanatory diagram illustrating an example of guiding of light Li in the diffuser provided in the lighting unit and an example of generation of light Ls.

FIG. 7 is an explanatory diagram illustrating an example of guiding of light Li in the diffuser provided in the lighting unit and an example of generation of light Ls. As illustrated in FIG. 7, the diffuser 20 may receive light Li emitted from the light source(s) 10 through the side surface f21, and while guiding it as light Lt inside the diffuser 20, scatter part of it and emit it as light Ls through at least the front surface f22.

The diffuser 20 includes a base material 201 and particles 202.

The particles 202 are, for example, nanoparticles. "Nanoparticles" refers to particles having a size on the order of nanometers (nm). In general, "nanoparticles" refers to particles from one to hundreds of nanometers in size. The particles 202 are, for example, particles having a particle diameter on the order of nanometers.

The particles 202 may have a spherical shape or another shape.

The diffuser 20 may include multiple types of particles 202. In this case, the particle diameter of the particles 202 may be an average particle diameter. Also, the diffuser may include, as one of the multiple types of particles 202, particles other than nanoparticles.

The particles 202 are, for example, inorganic oxide particles. Examples of the inorganic oxide include $ZnO$, $TiO_2$, $ZrO_2$, $SiO_2$, and $Al_2O_3$.

The particles 202 scatter light Li entering the diffuser 20 to generate light Ls. Also, the particles 202 scatter light Lt transmitted in the diffuser 20 to generate light Ls.

The base material 201 contains the particles 202. The particles 202 may be added in the base material 201. The particles 202 are, for example, dispersed in the base material 201.

The base material 201 is not particularly limited, but is, for example, a transparent material. The base material 201 need not necessarily be transparent to all the wavelengths of light Li. As an example, the base material 201 may have absorption at a specific wavelength of the wavelengths of light Li.

The transmittance (in-line transmittance) of the base material 201 per a light guiding distance of 5 mm is preferably 90% or more, more preferably 95% or more, and still more preferably 98% or more, at one or more design wavelengths. Here, the design wavelength(s) should be predetermined wavelength(s) of the wavelengths of the incident light. The number of the design wavelength(s) is not limited to one, and the design wavelength(s) may be multiple wavelengths or a band of wavelengths (wavelength band). For example, when the incident light is white light, the design wavelength(s) may be one or more of the wavelengths of 450 nm, 550 nm, and 650 nm. The design wavelength(s) may be three wavelengths of 450 nm, 550 nm, and 650 nm.

The base material 201 is, for example, solid. The base material 201 may be, for example, a resin plate using thermoplastic polymer, thermosetting resin, photopolymerizable resin, or the like. Also, for the resin plate, it is possible to use acrylic polymer, olefin polymer, vinyl polymer, cellulosic polymer, amide polymer, fluorine polymer, urethane polymer, silicone polymer, imide polymer, or the like. The diffuser 20 may be formed by performing hardening treatment on such material for the base material 201 that has not been hardened, with the particles 202 dispersed therein, for example. The base material 201 is not necessarily solid, and may be liquid, liquid crystalline, or gel-like material.

Also, for example, the diffuser 20 may be formed by a porous material made by a sol-gel method, an organic molecule dispersed material, an organic-inorganic hybrid material (also referred to as an organic-inorganic nanocomposite), or a metallic particle dispersed material. As an example, the diffuser 20 may be an organic-inorganic hybrid resin, and may be, for example, a hybrid resin of resin and inorganic oxide. In this case, the diffuser 20 includes, as a substance serving as the particles 202, inorganic oxide particles formed by sol-gel curing with a base material 201 including an inorganic oxide material and an organic compound as a base. In the present disclosure, minute voids (or holes) or the like formed through such a production process are considered as the particles 202.

Also, the diffuser 20 may be one in which minute irregularities smaller than a wavelength of blue light are formed on a surface of the base material 201. In this case, the diffuser 20 includes, as the particles 202, minute recesses or projections formed on the surface of the base material 201. In this case, the recesses or projections preferably have a maximum diameter on the order of nanometers (e.g., from one to hundreds of nanometers).

The specific configuration of the diffuser 20 is not limited as long as the diffuser 20 is a structure having a scattering power. For example, the particles 202 and base material 201 need not necessarily be clearly distinguished as different elements in the diffuser 20.

Also, a translucent functional coating, such as an antireflection coating, an antifouling coating, a heat shielding coating, or a water repellent finish may be applied to at least one surface of the diffuser 20. Also, in view of the functionality (such as impact resistance, water resistance, or heat resistance) as a window, the diffuser 20 may be sandwiched by two transparent substrates (e.g., glass plates), for example. In this case, the diffuser 20 may be an interlayer of a laminated glass.

The diffuser 20 has, for example, a plate shape. The plate shape is not limited to a flat plate shape. Thus, the plate shape may be a curved shape. For example, the diffuser 20 has a shape such that one or both of the front surface f22 and back surface f23 (the first surface and second surface) is curved. When the front surface f22 and back surface f23 are curved, the directions of the curvatures of both surfaces may be the same or different. For example, both surfaces may be curved surfaces having convex shapes (outwardly convex shapes). Also, for example, both surfaces may be curved surfaces having concave shapes (inwardly convex shapes). Also, for example, it is possible that one of the surfaces is a curved surface having a convex shape and the other of the surfaces is a curved surface having a concave shape. Also, the diffuser 20 may include, on part of its surface, a slope, a step, a recess, a projection, or the like. The above relationship between the front surface f22 and the back surface f23 can apply to, for example, the relationship between opposite side surfaces.

The diffuser 20 has, for example, a rod shape. The rod shape is not limited to a shape, such as a cylinder, a quadrangular prism, or a triangular prism, that is rectangular in a cross-section parallel to an extending direction of the column body, or a shape such that a perimeter of the column body is constant in a height direction. The extending direction of the column body is, for example, the z axis direction when it is assumed that a base of the column body is the surface f21a in FIG. 5. Examples of the rod shape also include shapes equivalent to plate shapes. In this case, a rod shape such that the bases of the column body correspond to the main surfaces of a plate shape and at least one of the bases is the main light emitting surface can be considered as a plate shape.

When the diffuser 20 has a rod shape, an extending direction of the column body is set in the z axis direction. The y axis direction, which is an axial direction parallel to the main emission direction, is set in a normal direction of a side surface of the column body. Thus, the main light emitting surface is set to be part of the side surface of the column body. Also, the incident surface is set to be at least one of the bases of the column body. When the diffuser 20 has a rod shape, a region of the side surface of the column body in which the main light emitting surface is formed may be considered as the first surface. Besides, a region of the side surface of the column body opposite the first surface may be considered as the second surface. Also, the two bases of the column body may be considered as a side surface. The side surface may further include a region of the side surface of the column body other than the first surface or second surface.

A top view shape (which is a shape on the xz plane in the drawings, and will be referred to below as a front shape) of the diffuser 20 is not particularly limited. For example, the front shape of the diffuser 20 may be a rectangular shape, a polygonal shape, a circular shape, a western barrel shape, or a spool shape, and besides, may be a shape obtained by connecting two or more straight lines, a shape obtained by connecting two or more arcs, a shape obtained by connecting one or more straight lines and one or more arcs, or the like.

Also, side view shapes (which are shapes on the xy plane and yz plane in the drawings, and will be referred to below as side shapes) of the diffuser 20 are not particularly limited. For example, each side shape of the diffuser 20 may be a rectangular shape, a western barrel shape, or a spool shape, and besides, may be a shape obtained by connecting four or more straight lines including two opposite straight lines, a shape obtained by connecting two or more straight lines including two opposite straight lines and two or more arcs, or the like.

As an example, the diffuser 20 according to the first embodiment is described below as having a plate shape.

The side surface f21 (edge surface) receives light Li emitted by the light source(s) 10. The side surface f21 is disposed to face the light emitting surface(s) 11 of the light source(s) 10, for example.

The front surface f22 (first surface) emits light Ls scattered by the particles 202 (including not only nanoparticles but also compositions (oxides made by sol-gel curing or other compositions), voids (or holes), and recesses or projections on a surface that have sizes on the order of nanometers, which will be referred to below collectively as nano-order optical media). Here, the nano-order optical media are not particularly limited as long as they are optical media (including interfaces) that cause Rayleigh scattering or scattering phenomena like Rayleigh scattering, to light Lt in the base material 201. Also, the front surface f22 may emit light Lt guided in the diffuser 20. For example, the front surface f22 may emit light reaching an edge portion opposite the incident surface after being guided in the diffuser 20, as light reproducing sunlight. In the present disclosure, unless otherwise noted, the term "particles 202" is used as a general term for the nano-order optical media as described above.

Also, the back surface f23 (second surface) may emit light Ls scattered by the particles 202. Also, the back surface f23 may emit light Lt guided in the diffuser 20. For example, the back surface f23 may emit light reaching an edge portion opposite the incident surface after being guided in the diffuser 20, in order to prevent stray light.

The back surface f23 is opposite the front surface f22. Light Lt entering the diffuser 20 is reflected and guided by the front surface f22 and back surface f23. The light Lt is guided, for example, by total reflection. For example, the light Lt is guided in the diffuser 20.

Also, a surface other than the front surface f22 and back surface f23 may emit light Ls scattered by the particles 202. Also, a surface other than the front surface f22 and back surface f23 may emit light Lt guided in the diffuser 20.

<<Rayleigh Scattering>>

Figure 8:
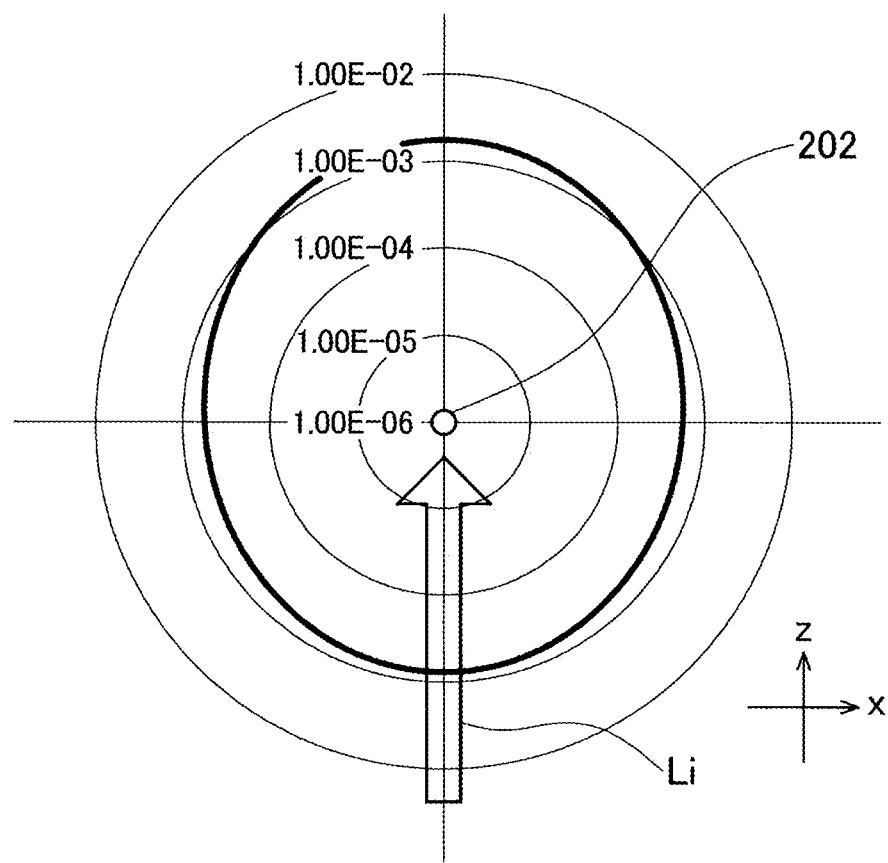
FIG. 8 is an explanatory diagram illustrating an example of a scattered light intensity angular distribution due to Rayleigh scattering by a single particle.

Rayleigh scattering, which is a light scattering phenomenon, will be described below with reference to FIG. 8. FIG. 8 is a diagram illustrating an example of a scattered light intensity angular distribution due to Rayleigh scattering by a single particle 202.

Light striking the particle 202 is described to be, for example, light Li emitted from the light source(s). The light striking the particle 202 may be light Lt guided in the diffuser 20. The vertical axis Z is an axis parallel to a traveling direction of the light Li. The light Li travels in the +Z axis direction. The horizontal axis X is an axis perpendicular to the vertical axis Z.

In a case where the particle diameter of a particle is smaller than the wavelengths of visible light, when a light beam strikes the particle, Rayleigh scattering occurs. The wavelengths of visible light range, for example, from 380 nm to 780 nm. Specifically, Rayleigh scattering occurs when a size parameter $\alpha$ given by the particle diameter d of the particle and the wavelength $\lambda$ of the light satisfies the following formula (1):

$$\alpha << \pi \cdot d/\lambda, \quad (1)$$

where "·" denotes multiplication.

In Rayleigh scattering, the scattering cross-section $\sigma$ is a parameter that indicates the probability of scattering, and has the relationship of the following formula (2) with the particle diameter d and the wavelength $\lambda$ of the light:

$$\sigma \propto d^6/\lambda^4. \quad (2)$$

Formula (2) shows that the scattering cross-section $\sigma$ in Rayleigh scattering is inversely proportional to the fourth power of the wavelength $\lambda$ of the light. Thus, in Rayleigh scattering, light of a shorter wavelength is more likely to be scattered. Thus, formula (2) shows that blue light is more likely to be scattered than red light. The wavelength $\lambda$ of the blue light is, for example, 450 nm. The wavelength $\lambda$ of the red light is, for example, 650 nm.

FIG. 8 illustrates an unpolarized scattered light intensity distribution. The particle diameter d of the particle 202 is 100 nm. The refractive index n of the particle 202 is 1.43. The refractive index of the base material 201 is 1.33. The wavelength of the light is 450 nm.

As illustrated in FIG. 8, in Rayleigh scattering, the scattered light is emitted in all directions. Thus, even when light is caused to enter through the side surface f21 of the diffuser 20, it is possible to extract light through the front surface f22 and back surface f23 perpendicular to the side surface f21.

<<Generation of Scattered Light Simulating Sky>>

The principle of generation of scattered light simulating a sky (in particular a blue sky) will be described below with reference to FIGS. 7 and 8.

As already described, light Li emitted from the light source(s) 10 enters through the side surface f21 of the diffuser 20. The light Li entering through the side surface f21 is guided as light Lt in the diffuser 20. The entering light Lt is reflected by the front surface f22 and back surface f23 of the diffuser 20 (see FIG. 7).

In transmitting in the diffuser 20, part of the light Lt strikes the particles 202 or the like (or is obstructed by the particles 202 or the like). The light Lt striking the particles 202 or the like is scattered in all directions (see FIG. 8).

Of the scattered light, light incident on the front surface f22 at incident angles not greater than the critical angle is emitted as light Ls through the front surface f22. The critical angle refers to the smallest incident angle that yields total reflection when light travels from a part having a higher refractive index to a part having a lower refractive index.

Of the scattered light, light incident on the back surface f23 at incident angles not greater than the critical angle is emitted as light Ls through the back surface f23. The critical angle refers to the smallest incident angle that yields total reflection when light travels from a part having a higher refractive index to a part having a lower refractive index.

At this time, from formula (2), in Rayleigh scattering, light of a shorter wavelength is more likely to be scattered. Thus, the correlated color temperature Tcs of the scattered light is higher than the correlated color temperature Tci of the incident light. For example, the correlated color temperature Tci is the correlated color temperature of light Li emitted by the light source(s) 10. For example, the correlated color temperature Tcs is the correlated color temperature of light Ls.

When light Li has a spectral distribution over the entire visible light range, blue light is preferentially scattered. Light Li is, for example, white light. The light source(s) 10 include, for example, white LEDs. Thus, by appropriately designing the light source(s) 10 and diffuser 20, light Ls is made to have a correlated color temperature representing a blue close to the color of the actual sky.

Since the amount of light Ls depends on the amount of incident light Li, by appropriately setting the amount of light of the used light source(s) 10, it is possible to reproduce the sky color while providing sufficient brightness as a lighting device. Also, by appropriately designing the light guiding direction of light Lt, the light guiding distance, and the particle concentration in the diffuser 20, it is possible to reduce a thickness of the diffuser 20. For example, with the configuration of this embodiment, the thickness of the diffuser 20 can be set to 100 mm or less. Also, for example, the thickness of the diffuser 20 may be 20 mm or less, and can be 10 mm or less. Moreover, for example, the thickness of the diffuser 20 can be 5 mm or less. Also, for example, when the size(s) (the length(s) in the Y axis direction) of the light source(s) 10 are small, or when light Li is light, such as light emitted from laser light source(s) or concentrated spot light beam(s), whose illuminating area(s) in the incident surface are small, the thickness of the diffuser 20 can be 1 mm or less.

In the above example, the description has been made by dividing the surface into two: the front surface f22 and back surface f23. However, when the diffuser 20 has a rod shape and the whole of the main surface(s) (the side surface(s) of the rod shape) is taken as the main light emitting surface, the above front surface f22 should be replaced with "a region of the main surface(s) that faces in the +y axis direction", and the above back surface f23 should be replaced with "a region of the main surface(s) that faces in the −y axis direction"

Figure 9:
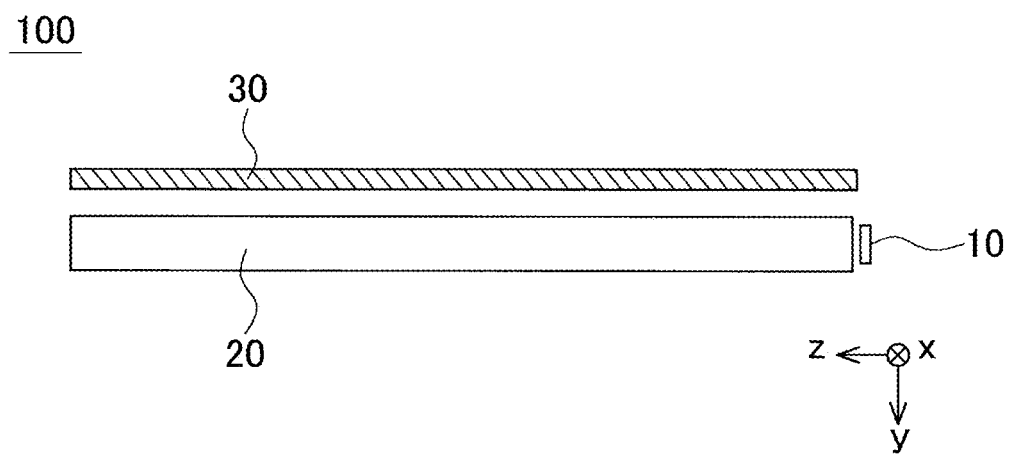
FIG. 9 is a cross-sectional view illustrating another configuration example of the lighting unit.

FIG. 9 is a cross-sectional view illustrating another configuration example of the lighting unit 100. As illustrated in FIG. 9, the lighting unit 100 may include a back plate 30 in addition to the light source(s) 10 and diffuser 20. The back plate 30 is provided on the back surface side (in this example, the −y axis side) of the diffuser 20. The back plate 30 may be provided to face the back surface f23 of the diffuser 20. The distance between the back plate 30 and the diffuser 20 is preferably small.

The back plate 30 has a reflecting function or is opaque, and its transmittance is preferably 50% or less, and more preferably 10% or less.

The back plate 30 is preferably a diffuse reflector, and more preferably a white diffuse reflector. The back plate 30 may be a light absorber.

The back plate 30 may be openable and closable. By the back plate 30 being provided so that it can be opened and closed, when a user wishes to see a space on the back surface side or introduce external light, it is possible to open the back plate 30 to allow the space on the back surface side to be seen through the diffuser 20 or allow external light to be introduced through the diffuser 20, and the lighting unit 100 can be used also as a window. The back plate 30 may be such that it can be opened and closed by folding the back plate 30 or putting the back plate 30 into a door pocket, like, e.g., a blind or a shutter.

It is possible that the shielding state of the back plate 30 can be changed in accordance with a voltage applied to the back plate 30, like, e.g., a liquid crystal shutter. It is possible that the shielding state of the back plate 30 can be changed in accordance with a voltage applied to the back plate 30, like, e.g., a liquid crystal panel.

Also, the back plate 30 may be supported integrally with the diffuser 20 in a frame 500. In this case, the back plate 30 may be supported so that it can be opened and closed integrally with the diffuser 20.

<<Advantages of Back Plate 30>>

When the light source(s) 10 are turned on, light Ls is emitted through not only the front surface f22 but also the back surface f23 of the diffuser 20. For example, when it is assumed that the lighting unit 100 is disposed in a wall separating spaces and the front surface f22 faces one (referred to below as the inside) of the spaces in which an observer is present, light Ls emitted through the back surface f23 to the other (referred to below as the outside) of the spaces on the back surface f23 side is not seen by the observer, resulting in loss. Also, when the lighting unit 100 is used also as a window, the emission of light Ls to the outside may cause light pollution for a person other than the observer located in the outside.

By providing the back plate 30 on the back surface f23 side of the diffuser 20, when the light source(s) 10 are turned on, it is possible to prevent light Ls emitted through the back surface f23 of the diffuser 20 from being emitted to the outside. Moreover, by using, as the back plate 30, a member, such as a diffuse reflector, that reflects light Ls emitted through the back surface f23, it is possible to cause light Ls emitted through the back surface f23 to be emitted through the front surface f22, thereby improving the light use efficiency of the lighting unit 100, more specifically the efficiency at which light Li is used as the first light.

Thus, providing the back plate 30 on the back surface side of the diffuser 20 improves the light use efficiency of the lighting unit 100 and reduces light leakage to the back surface side.

<Configuration of Lighting Device 200>

Figure 10:
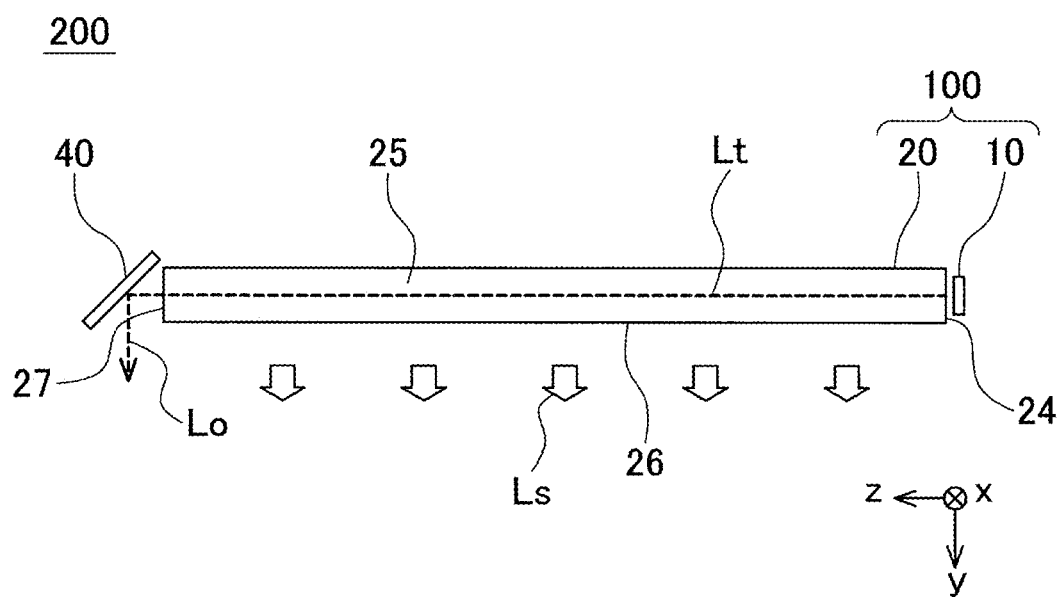
FIG. 10 is a cross-sectional view illustrating an example of a configuration of a lighting device according to a first embodiment.

Next, a lighting device 200 according to the present embodiment will be described with reference to the drawings. FIG. 10 is a cross-sectional view illustrating an example of a configuration of the lighting device 200 according to the first embodiment. As illustrated in FIG. 10, the lighting device 200 includes one or more light sources 10, a light emitter 20, and a light extractor 40.

In the lighting device 200, the light emitter 20 includes a light incident portion 24, a light guiding portion 25, a first light emission portion (scattered light emission portion) 26, and a second light emission portion (transmitted light emission portion) 27. The light emitter 20 is, for example, the above-described diffuser 20.

The light incident portion 24 receives light emitted from the light source(s) 10. The light guiding portion 25 guides the received light. Also, the light guiding portion 25 generates first light while guiding the received light. The light guiding portion 25 may include, for example, a medium and a nano-order optical medium, such as light scattering particles, and generate the first light (light Ls) by scattering the received light with the nano-order optical medium while guiding the received light in the medium.

The first light emission portion 26 emits the first light generated by the light guiding portion 25. The first light emission portion 26 corresponds to the above-described main light emitting surface. Also, the second light emission portion 27 emits part of the received light that reaches a light guiding edge portion without becoming the first light, i.e., transmitted light reaching the light guiding edge portion. Hereinafter, light emitted from the second light emission portion 27 may be referred to as light Lo.

The light emitter 20 includes the light incident portion 24 at a first edge portion, and the second light emission portion 27 at a second edge portion opposite the first edge portion, for example. In cases such as when the light emitter 20 is of a back-lit type and receives light through the back surface, the second light emission portion 27 may be provided in the same surface as the first light emission portion 26. Also, as described later, in cases such as when a light deflector 50 or the like that changes a traveling direction of the transmitted light is provided at a position opposite the light incident portion 24, the position at which the second light emission portion 27 is provided is not limited to the second edge portion. For example, regardless of whether it is an edge-lit type or a back-lit type, the second light emission portion 27 may be provided in a partial region of a surface in which the first light emission portion 26 is provided.

Light Li emitted from the light source(s) 10 enters the light emitter 20 through the light incident portion 24. Light Li entering the light emitter 20 turns into light Ls and exits through the first light emission portion 26 while being guided as light Lt in the light guiding portion 25 in the light emitter 20. Also, light Li entering the light emitter 20 is emitted as light Lo through the second light emission portion 27 after being guided as light Lt in the light guiding portion 25 in the light emitter 20.

For example, when the light emitter 20 is the above-described diffuser 20, which generates the first light by using Rayleigh scattering or a scattering phenomenon like Rayleigh scattering, the correlated color temperature of light Lo emitted through the second light emission portion 27 is lower than the correlated color temperature of light Ls emitted through the first light emission portion 26.

In the lighting device 200 of the present embodiment, at least part of the light Lo emitted through the second light emission portion 27 is emitted in the same direction as light Ls (in the illustrated example, in the +y axis direction, which is a direction toward a space facing the main light emitting surface in which the first light emission portion 26 is provided) by the light extractor 40 provided near the second light emission portion 27.

The light extractor 40 may have a deflecting function, specifically a function of changing the traveling direction of light Lo emitted through the second light emission portion 27 and directing it in a particular direction. The particular direction may be a direction (which is not limited to the +y axis direction and may be the −y axis direction) perpendicular to the light guiding direction of light Lt, may be the traveling direction of light Ls, may be a direction toward the space facing the main light emitting surface in which the first light emission portion 26 is provided, as already described, and may be a direction toward a space in which a user of the lighting device is present. The deflection mentioned here includes deflection, such as refraction, in transmission, and deflection due to reflection.

Also, in the light extractor 40, for example, a lens, a mirror, a film, a surface coating, or the like may be formed to control refraction, reflection, diffusion, transmission, or the like of light Lo, which is emitted light. Thus, the light extractor 40 should have a function of affecting the incident light to change the traveling direction, spread, illuminating area, or intensity distribution of the light and direct it in the particular direction.

As a specific example, light Lo emitted through the second light emission portion 27 is scattered light spreading in an angular direction, and in order to deflect the scattered light and convert it into light for illuminating a space (a space in which an observer is present) located in the particular direction, the light extractor 40 may be a mirror having a curvature. With such a configuration, light reflected by the light extractor 40 can be controlled to be substantially parallel light and travel in the particular direction.

Also, to provide a configuration that does not dazzle a person who is located in the particular direction and looks at the light extractor 40, it is possible to provide the light extractor 40 with a diffusing function. In this case, it is possible to convert light emitted from the second light emission portion 27 into light traveling in the particular direction while reducing dazzling of a person.

Although the illustration is omitted, another light extractor 40 may be provided at the first edge portion at which the light source(s) 10 are provided. However, in this case, the light extractor 40 deflects light emitted from the first edge portion, the light source(s) 10, or another light source and converts it into light traveling in the particular direction, in a space facing the first edge portion of the light emitter 20 at which the light incident portion 24 is provided, instead of deflecting light emitted through the second light emission portion 27 of the light emitter 20 and converting it into light traveling in the particular direction. Hereinafter, such a light extractor 40 provided in a space facing the first edge portion may be referred to as a second light extractor 40a.

By providing such a light extractor 40, it is possible, for example, to make light Lo simulate sunlight. Specifically, it is possible to make an observer feel as if the sun were present on the back surface side of the light emitter 20 and sunlight from the sun were coming through the light emitter 20 or its periphery. Also, for example, when the light emitter 20 simulates a window by emitting the first light simulating the sky, by providing the light extractor 40 at a position viewable by an observer, it is possible to make the light extractor 40 look as if it were a window frame illuminated by sunlight from the sun. In this case, it is possible to make the reflectance of a partial region of the light extractor 40 small, thereby making the region a non-light emitting region. By providing such a non-light emitting region in a surface of the light extractor 40, it is possible to represent a sunny area and a shaded area on the light extractor 40.

Figure 11A:
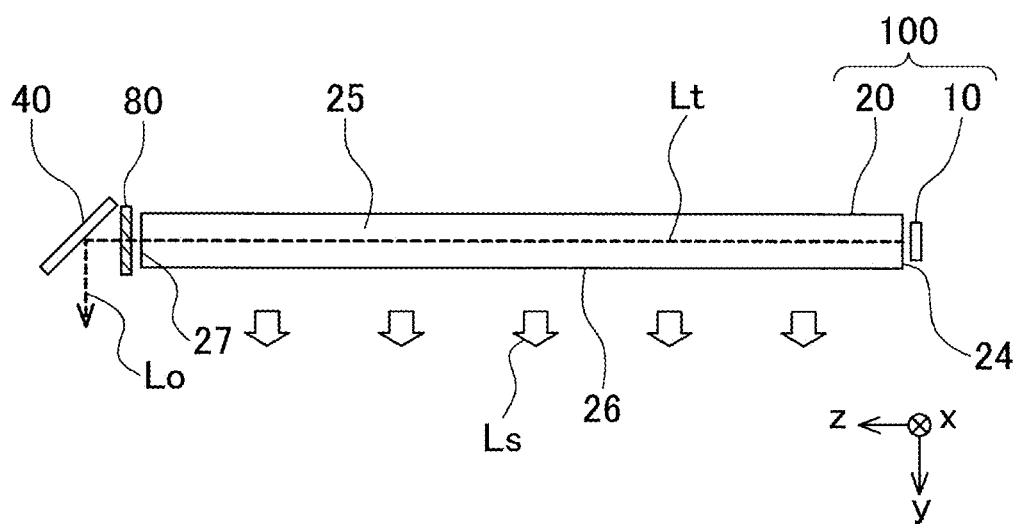
FIGS. 11A to 11C are views illustrating another example of the lighting device according to the first embodiment.

FIG. 11A is a cross-sectional view illustrating another configuration example of the lighting device 200. A lighting device 200a illustrated in FIG. 11A includes a light limiter 80 in addition to the configuration of the lighting device 200 illustrated in FIG. 10. The light limiter 80 is disposed between the light emitter 20 (in particular the second light emission portion 27) and the light extractor 40, and has a function of reducing the light emitted from the light emitter 20 toward the light extractor 40. By providing such a light limiter 80 for blocking part of light Lo on an optical path from the second light emission portion 27 to the light extractor 40, a partial region of the light extractor 40 can be made a non-light emitting region.

The light limiter 80 is formed by, for example, a member, such as a mask, that absorbs or reflects at least part of the incident light. In the example illustrated in FIGS. 11A to 11C, a substantially triangular member that limits transmittance of light is provided as the light limiter 80. In this example, more specifically, the light limiter 80 absorbs at least part of the light emitted through the second light emission portion 27 and reaching the light limiter 80.

The light limiter 80 thus attenuates the intensity of the light traveling from the second light emission portion 27 toward the light extractor 40 in the partial region, so that a shadow of the light limiter 80 is projected to the light extractor 40. The intensity of light is also referred to as the amount of light per unit area or luminance.

Figure 11B:
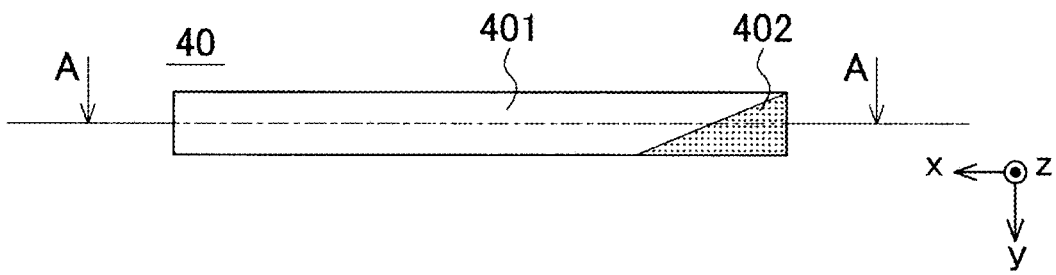

FIG. 11B illustrates a situation in which a shadow of the light limiter 80 is projected to the light extractor 40. The light extractor 40 in this example includes a bright region 401 and a dark region 402. The dark region 402 is, for example, a region to which the shadow of the light limiter 80 is projected. In this example, the intensity of light emitted from the dark region 402 is lower than the intensity of light emitted from the bright region 401.

Figure 11C:
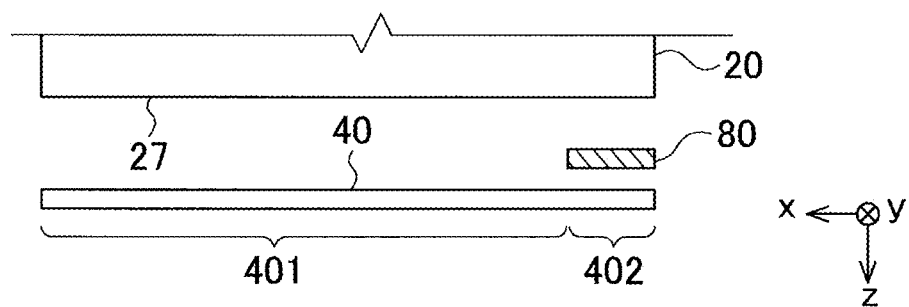

Also, FIG. 11C is a top view illustrating an arrangement example of members for forming the bright region 401 and dark region 402 illustrated in FIG. 11B. FIG. 11C corresponds to an A-A cross-sectional view of FIG. 11B. As illustrated in FIG. 11C, for example, the light limiter 80 may be disposed in the dark region 402 or a region corresponding to the dark region 402 on an optical path before light Lo emitted through the second light emission portion 27 is incident on an incident surface of the light extractor 40 and emitted as light traveling in the particular direction from an emission surface of the light extractor 40.

The light limiter 80 may be disposed, for example, between an edge portion of the light emitter 20 at which the second light emission portion 27 is provided and the light extractor 40, on a surface of the light extractor 40 in which an incident surface or an emission surface of light Lo emitted through the second light emission portion 27 is formed, or in various interface(s) located in the light extractor 40, in such a manner as to cover the dark region 402 or a region corresponding to the dark region 402.

Figure 12A:
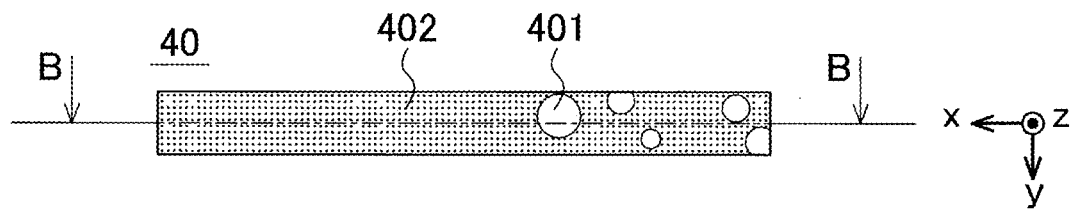
FIGS. 12A and 12B are explanatory diagrams illustrating another example of a light extractor as viewed from a viewing side and an arrangement example of members.
Figure 12B:
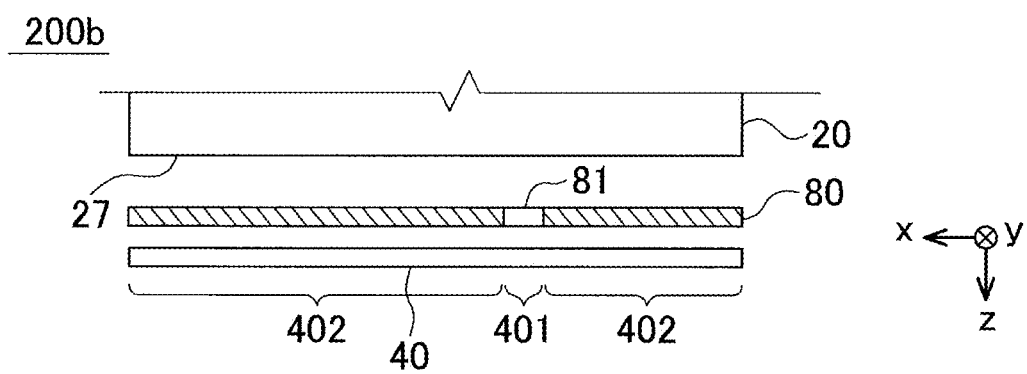

FIGS. 12A and 12B are explanatory diagrams illustrating another example of the light extractor 40 as viewed from a viewing side and an arrangement example of members. FIG. 12A illustrates a situation in which a shadow of the light limiter 80 is projected to the light extractor 40. FIG. 12B is a top view illustrating an arrangement example of members for forming a bright region 401 and a dark region 402 illustrated in FIG. 12A. FIG. 12B corresponds to a B-B cross-sectional view of FIG. 12A. As illustrated in FIG. 12B, for example, it is possible that the light limiter 80 is disposed in a region corresponding to the entire region of an incident surface of the light extractor 40, and an optical member (a thin film serving as an antireflection layer for a base material of the light limiter 80) that functions to increase the intensity of the transmitted light, an opening, or the like is provided in the bright region 401 or a region corresponding to the bright region 401 on an optical path before light Lo emitted through the second light emission portion 27 is incident on the incident surface of the light extractor 40 and emitted as light traveling in the particular direction from the emission surface of the light extractor 40, in the light limiter 80. The example illustrated in FIG. 12B is an example in which an opening 81 is provided in a region corresponding to the bright region 401 in the light limiter 80.

By providing such a light limiter 80, it is possible to make an observer feel as if a sunny area and a shaded area were formed on the light extractor 40 by light coming from the sun through the light emitter 20, providing a more natural view.

The light extractor 40 may be provided as a modification of the light deflector 50 to be described later, or may be provided separately from the light deflector 50. In this case, the light extractor 40 may be provided together with the light deflector 50 in one lighting device.

<First Modification>

Figure 13:
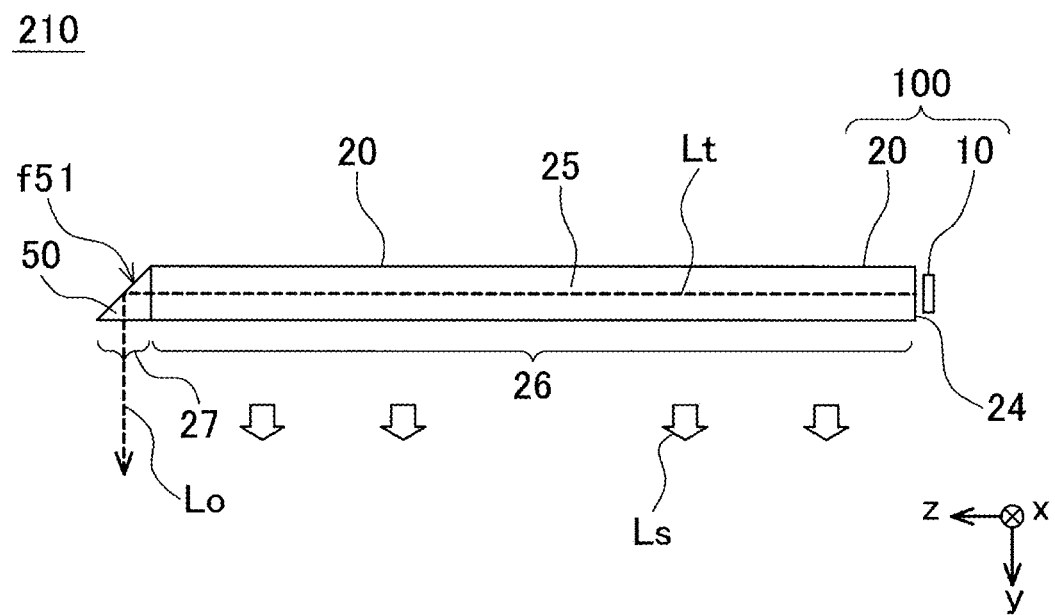
FIG. 13 is a cross-sectional view illustrating a modification of the lighting device according to the first embodiment.

FIG. 13 is a cross-sectional view illustrating another example of the lighting device according to the first embodiment. A lighting device 210 illustrated in FIG. 13 is an example in which the light emitter 20 includes the light deflector 50 corresponding to the above-described light extractor 40. The light deflector 50 is provided at an edge portion of the light emitter 20. The light deflector 50 is provided, for example, at an edge portion opposite the edge portion at which the light incident portion 24 is provided. In the illustrated example, the light deflector 50 is provided at one of the side surfaces of the light emitter 20.

The light deflector 50 changes the traveling direction of light Lt. The light deflector 50 may change the traveling direction of light Lt to the above-described particular direction. Also, the light deflector 50 may include a reflecting surface f51. In this case, the light deflector 50 may reflect light Lt reaching the light deflector 50, at the reflecting surface f51, thereby changing the traveling direction of light Lt.

The reflecting surface f51 is, for example, a mirror surface. The reflecting surface f51 is, for example, a diffuse reflecting surface. The reflecting surface f51 is provided by, for example, metal deposition or white paint.

The light deflector 50 may be formed by, for example, cutting off part of the surface of the light emitter 20. In this case, the cut surface is the reflecting surface f51. An edge portion of the light emitter 20 including the cut surface is taken as the light deflector 50. As such, the light emitter 20 may include the light deflector 50.

The light deflector 50 may be integrated with or separate from the light guiding portion 25. For example, when the light deflector 50 is provided integrally with the light guiding portion 25, the light deflector 50 may be formed in an edge portion of the light guiding portion 25. In this case, particles 202 may be included in the edge portion. Also, for example, when the light deflector 50 is provided separately from the light guiding portion 25, a member forming the light deflector 50 and a member forming the light guiding portion 25 may be bonded together. In this case, the member forming the light deflector 50 and the member forming the light guiding portion 25 are optically connected to each other.

Also, in the example illustrated in FIG. 13, the first light emission portion 26 and second light emission portion 27 are both provided in the light emission surface (front surface) taken as the main light emitting surface. As illustrated in FIG. 13, the first light emission portion 26 and second light emission portion 27 are preferably provided in different regions in the light emission surface. However, this does not apply to cases such as when particles 202 are included in the edge portion in which the light deflector 50 is formed. Thus, the region in which the first light emission portion 26 is provided and the region in which the second light emission portion 27 is provided may partially overlap. For example, it is possible that the first light emission portion 26 is provided over the entire region of the front surface of the light emitter 20 and the second light emission portion 27 is provided in a partial region of the front surface of the light emitter 20.

Even in the configuration in which the light emitter 20 includes the light deflector 50 in this manner, it is possible to provide the same effects as the configuration including the light extractor 40. Also in this example, the light deflector 50 may have a light scattering function. The light scattering function may be provided by applying surface treatment such as emboss processing to the reflecting surface f51. Also, the light scattering function may be provided by, for example, attaching a reflective and diffusive film to the reflecting surface f51, or applying white paint to the reflecting surface f51.

A light scattering function may be provided to a member in which the light deflector 50 is formed or the second light emission portion 27. In this case, it may be provided by dispersing light scattering particles in the member in which the light deflector 50 is formed, by applying surface treatment such as emboss processing or a light diffusing coating to the second light emission portion 27, or by attaching a light diffusing film to the second light emission portion 27.

<Second Modification>

Figure 14:
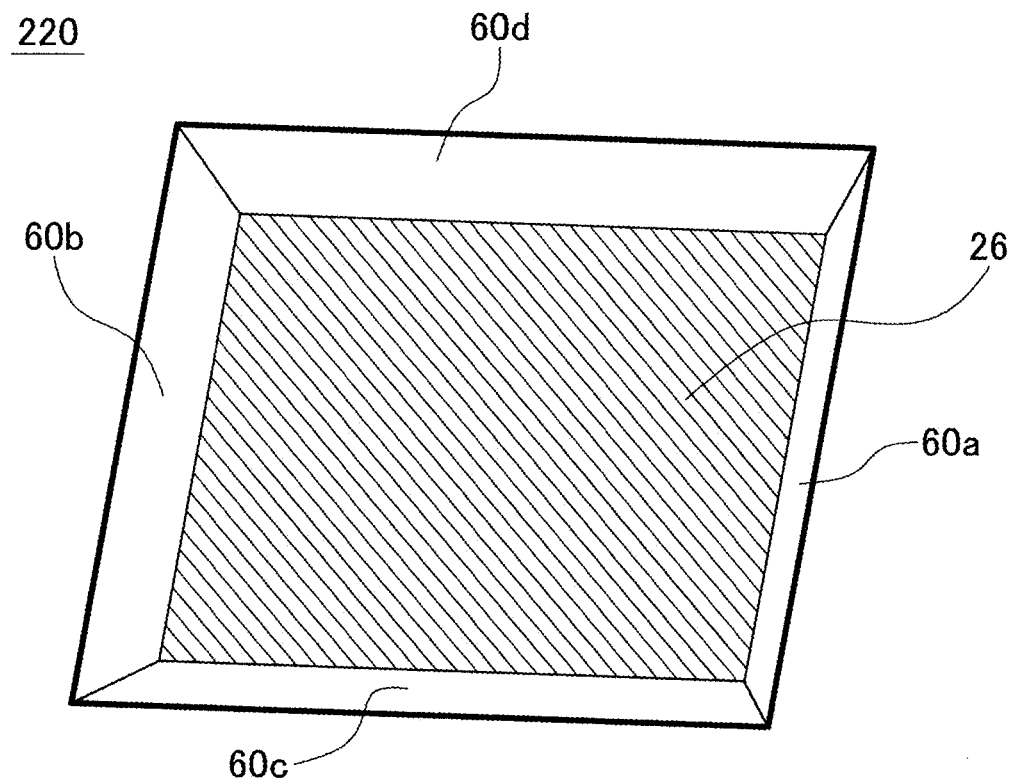
FIG. 14 is a perspective view illustrating a modification of the lighting device according to the first embodiment.
Figure 15:
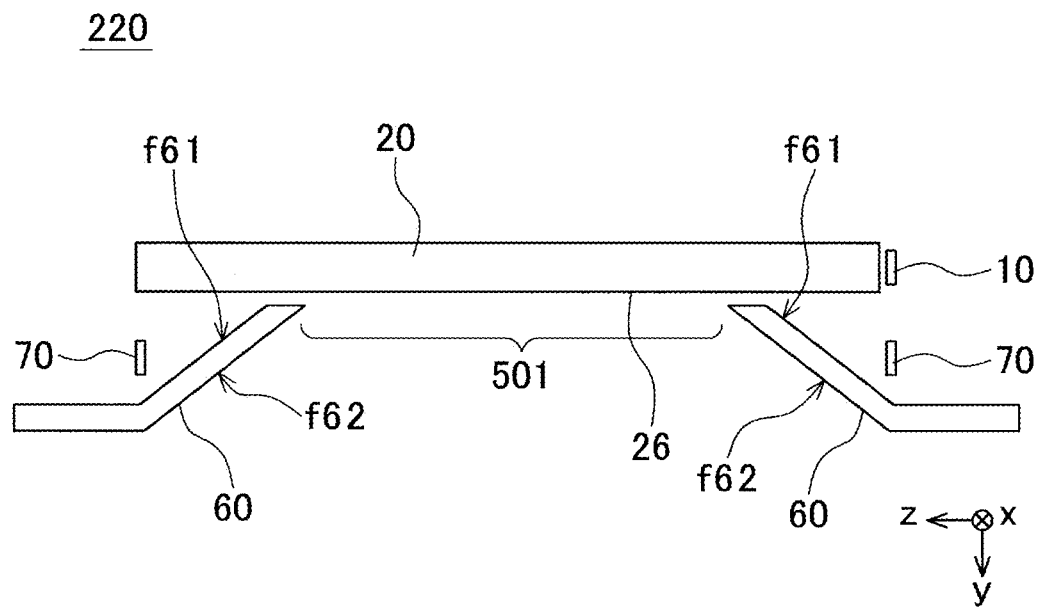
FIG. 15 is a cross-sectional view illustrating a modification of the lighting device according to the first embodiment.

FIGS. 14 and 15 are explanatory diagrams illustrating another example of the lighting device according to the first embodiment. FIG. 14 is a perspective view of a lighting device 220 that is another example of the lighting device according to the first embodiment, and FIG. 15 is a cross-sectional view of the lighting device 220.

The lighting device 220 includes one or more light sources 10, a light emitter 20, a frame member 60, and one or more frame light sources 70.

The frame member 60 is provided at at least one position in a space around the light emitter 20. The frame member 60 is provided, for example, in a predetermined region including a certain position in the space around the light emitter 20. Here, the space around the light emitter 20 includes space(s) facing side surface(s) of the light emitter and space(s) facing main surface(s) of the light emitter. The frame member 60 may be provided, for example, in a predetermined region of a space in front of the light emitter 20 (a space facing the front surface that is the main light emitting surface). Also, the frame member 60 may be provided, for example, in a predetermined region of a space lateral to the light emitter 20 (a space facing a side surface). Also, the frame member 60 may be provided, for example, in a predetermined region of a space behind the light emitter (a space facing the back surface opposite the main light emitting surface). The example illustrated in FIGS. 14 and 15 is an example in which the frame member 60 is provided in front of the light emitter 20. In the example illustrated in FIGS. 14 and 15, a gap is provided between the light emitter 20 and the frame member 60, but the frame member 60 may be provided in contact with the light emitter 20.

The frame member 60 may be disposed to surround the light emitter 20 or a space facing the main light emitting surface of the light emitter 20. Also, the frame member 60 may be disposed to surround both the light emitter 20 and a space facing the main light emitting surface of the light emitter 20. For example, the frame member 60 may be disposed in a space around the light emitter 20 to surround a space (a viewing side space) facing the main light emitting surface of the light emitter 20. Here, the space around the light emitter 20 may be, for example, a space within 500 mm. For example, the frame member 60 may be provided at a position within 500 mm in at least one of the front, rear, and lateral directions of the light emitter 20.

As already described, the frame member 60 may be disposed in contact with the light emitter 20, i.e., with no space between the frame member 60 and the light emitter 20. In this case, the light emitter 20 and frame member 60 may be connected to each other with a buffer or the like therebetween, for example.

Also, it is possible that the frame member 60 is divided into multiple parts and the parts are arranged with spaces therebetween. In this case, the arrangement direction is not particularly limited, and may be a longitudinal direction of each side of the main light emitting region, may be the traveling direction of the first light, or may be a direction outward from a center like a double shade structure. Also, the frame member 60 may be arranged in two or more directions. As such, various designs can be provided to the shape of the frame member 60.

The frame member 60 includes an incident surface f61 and an emission surface f62. In the example illustrated in FIG. 14, the incident surface f61 is a surface on an anti-viewing side of the frame member 60, and the emission surface f62 is a surface on a viewing side of the frame member 60. Here, the viewing side refers to a side that is seen by an observer located on the main light emitting surface side of the light emitter 20 in a state in which the lighting device is installed, and the anti-viewing side refers to the opposite side. The example illustrated in FIG. 14 is an example of a transmission-type frame member. When the frame member 60 is a reflection-type frame member, the incident surface f61 and emission surface f62 are formed in the same surface. More specifically, the incident surface f61 and emission surface f62 are both formed in a surface on the viewing side of the frame member 60.

For example, for convenience, the frame member 60 may be divided into multiple areas (in the example illustrated in FIG. 14, frame members 60a, 60b, 60c, and 60d corresponding to the respective sides of a rectangular main light emitting region 501, or the like). The division of the frame member 60 is not limited to the example illustrated in FIG. 14.

The frame light source(s) 70 are provided behind the frame member 60 (i.e., on the anti-viewing side as viewed from an observer). That is, the lighting device 220 includes the frame light source(s) 70 on the incident surface f61 side of the frame member 60.

The frame light source(s) 70 are, for example, LED light source(s). Also, the frame light source(s) 70 may be, for example, laser light emitting element(s), fluorescent tube(s), or the like. Although the illustration is omitted, each frame light source 70 may include a substrate and light emitting element(s), as with each light source 10. Also, each frame light source 70 may include multiple light emitting elements, as with each light source 10. Also, the number of the frame light source(s) 70 may be two or more, as with the light source(s) 10.

For example, when the frame member 60 is divided into multiple areas, the lighting device 220 may be configured such that at least one frame light source 70 is provided for each area of the frame member 60. As an example, when the main light emitting region 501 is polygonal and the frame member 60 is provided to surround the main light emitting region 501, multiple frame light sources 70 may be provided along each side of the main light emitting region 501. Also, as another example, when the main light emitting region 501 is polygonal and the frame member 60 is provided to correspond to opposite sides of the main light emitting region 501, multiple frame light sources 70 may be provided along each of the opposite sides of the main light emitting region 501.

The frame light source(s) 70 emit, for example, white light. Also, the color of light emitted by the frame light source(s) 70 may be a color other than white. The frame light source(s) 70 may include, for example, a white LED light source and an orange LED light source. Also, the frame light source(s) 70 may include, for example, a white LED light source having a low color temperature and a white LED light source having a high color temperature.

The frame member 60 is formed by, for example, a light diffuser. The light diffuser may be one obtained by dispersing fine particles in a transparent member, or may be, for example, one obtained by applying surface treatment such as emboss processing to a surface of a transparent member, one obtained by applying a light diffusing film to a surface of a transparent member, or one obtained by applying white paint to a surface of a transparent member.

Also, the frame member 60 may be formed by, for example, a transparent member and a light diffuser. In this case, the light diffuser may be provided on the anti-viewing side of the transparent member, the viewing side of the transparent member, or both the sides. The light diffuser may be formed by, for example, coating the transparent member with a thin film containing fine particles. The frame member 60 may be formed by applying or placing such a light diffusing thin film to or on the transparent member.

Also, in the case of a reflection type, the frame member 60 may be formed by, for example, a reflector and a light diffuser. In this case, the light diffuser is provided on the viewing side of the reflector.

Light emitted from the frame light source(s) 70 enters the frame member 60 through the incident surface f61 of the frame member 60 and exits through the emission surface f62. At this time, when the frame member 60 has a light diffusing function, the light entering the frame member 60 is converted into diffused light and emitted through the emission surface f62. In this manner, an observer is made to see the frame member 60 as a second light emitter that simulates sunlight. The frame member 60 may have, for example, a function of affecting the incident light to change the traveling direction, spread, illuminating area, or intensity distribution of the light and direct it in a particular direction (in this example, toward a space in which a user is present, i.e., a viewing side space).

In the frame member 60, the entire emission surface f62 may emit light, or only a partial region may emit light. Also, for example, when the frame member 60 is divided into multiple areas, it is possible to determine, for each area, whether to place the area in a light emitting state or a non-light emitting state. By controlling the lighting states of the frame light sources 70 for each area or for each of positions of the incident surface f61 facing them, it is possible to place a subset of the areas or a partial region in a light emitting state or a non-light emitting state.

For example, by providing a light limiter 80 as described above between the frame light source(s) 70 and the frame member 60, the intensity of light emitted from a partial region of the emission surface f62 of the frame member 60 can be made lower than the intensity of light emitted from another region. Thus, by providing the light limiter 80, it is possible to represent a sunny area and a shaded area on the emission surface f62 of the frame member 60. The frame member 60 may include the light limiter 80. In this case, the light limiter 80 is provided, for example, on an optical path before light emitted from the frame light source(s) 70 is emitted through the emission surface f62 of the frame member 60.

Also, although FIG. 15 illustrates an example in which the light source(s) 10 and frame light source(s) 70 are separately provided, the light source(s) 10 may provide the function of the frame light source(s) 70. In this case, it is possible to provide, between the light source(s) 10 and the light emitter 20, a light splitter (whose illustration is omitted) that splits light into light traveling to the light incident surface of the light emitter 20 and light traveling to the incident surface f61 of the frame member 60. In this case, a reflecting function portion of the light splitter may be provided with a light diffusing function so that the light traveling to the incident surface f61 of the frame member 60 is diffused light. Alternatively, it is also possible that side emitting type light source(s) are used as the light source(s) 10, a region other than a region of the light source(s) 10 facing the light incident surface of the light emitter 20 is covered with a reflector or the like, and while light emitted from the region facing the light incident surface of the light emitter 20 is allowed to travel toward the light incident surface of the light emitter 20, light emitted from the region other than the region is directed toward the incident surface f61 of the frame member 60.

Also, the above-described light extractors 40 (including the second light extractor 40a) are each an example of the reflection type frame member 60.

Figure 16:
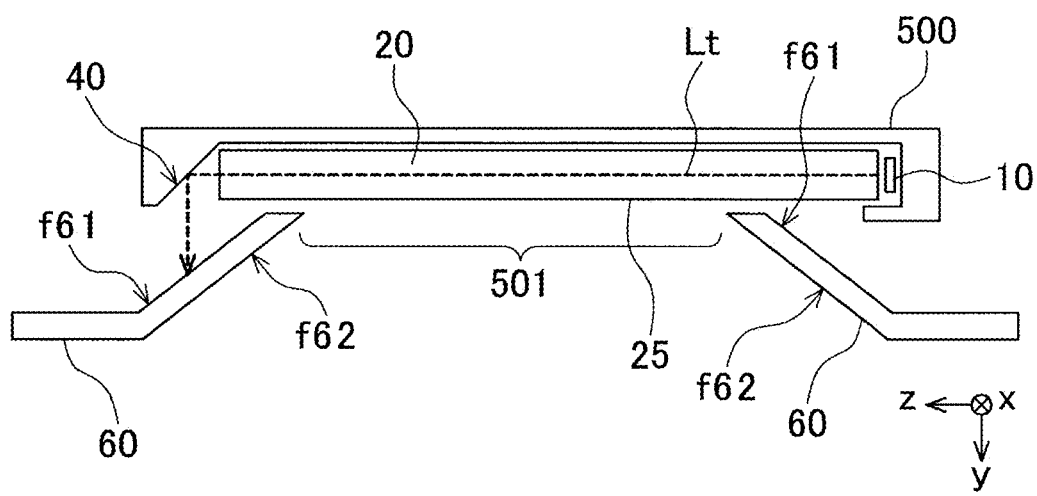
FIG. 16 is a cross-sectional view illustrating a modification of the lighting device according to the first embodiment.
Figure 17:
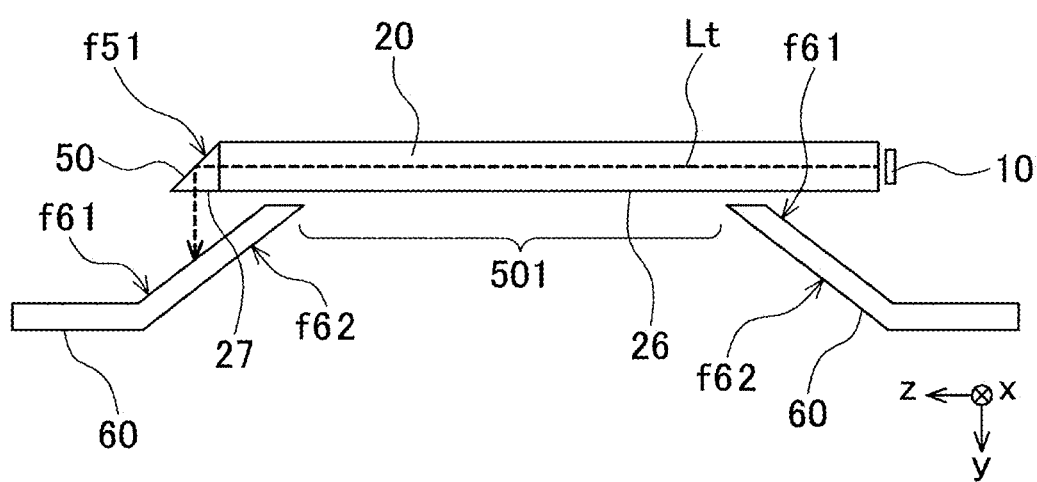
FIG. 17 is a cross-sectional view illustrating a modification of the lighting device according to the first embodiment.

Also, as illustrated in FIGS. 16 and 17, a light extractor 40 or light deflector 50 as described above may be provided instead of the frame light source(s) 70. A lighting device 220a illustrated in FIG. 16 is an example in which a light extractor 40 is provided instead of the frame light source(s) 70. The light extractor 40 illustrated in this example is provided in a frame 500. In the lighting device 220a illustrated in FIG. 16, light that is emitted from the light source(s) 10, enters through the light incident portion 24 of the light emitter 20, is guided in the light emitter 20, is emitted through the second light emission portion 27, and is deflected by the light extractor 40 is incident on the incident surface f61 of the frame member 60.

Also, a lighting device 220b illustrated in FIG. 17 is an example in which a light deflector 50 is provided instead of the frame light source(s) 70. The light deflector 50 illustrated in this example is formed by a reflecting surface f51 provided in the light emitter 20. In the lighting device 220b illustrated in FIG. 17, light that is emitted from the light source(s) 10, enters through the light incident portion 24 of the light emitter 20, is guided in the light emitter 20, is emitted through the second light emission portion 27, and is deflected by the light deflector 50 is incident on the incident surface f61 of the frame member 60.

By providing the frame member 60 in this manner, the frame member 60 can simulate a sunny region and a shaded region in a window frame, or light emitted from the frame member 60 can simulate sunlight reflected in a sunny region of a window frame. Thus, even in an environment into which no sunlight is actually coming from the sun, it is possible to provide an observer with a natural view that looks as if sunlight from the sun were coming through the light emitter 20.

Also, in the above configurations, each of the lighting devices 200, 200a, 200b, 210, 220, 220a, 220b may include a drive mechanism that changes a position, an angle, or a shape, or a combination thereof of at least one of the light extractor(s) 40, frame member 60, and light limiter 80. By changing the position, angle, or shape of at least one of the light extractor(s) 40, frame member 60, and light limiter 80 with the drive mechanism, it is possible to change a direction of light simulating sunlight from the sun or change a position, a size, or a shape of a sunny region or a shaded region formed on the light extractor(s) 40 or frame member 60, thereby making an observer perceive a more natural view.

For example, by changing the position, angle, or shape of the light limiter 80 with the drive mechanism, it is possible to change, with time, the projection pattern of the shadow formed on the light extractor 40, light deflector 50, or frame member 60 located ahead of the light limiter 80. In the case of changing the projection pattern of the shadow, the configuration may be configured to reproduce, for example, the change in solar altitude with the time of day and the season, so that an angle of a substantially triangular shape of the shadow is changed. Also, for example, by changing the position(s), angle(s), or shape(s) of the light extractor(s) 40 or frame member 60 with the drive mechanism, it is possible to change, with time, an emission direction or an illuminating area of the light simulating sunlight. Also, by changing a positional relationship with the light limiter 80, it is possible to change, with time, the projection pattern of the shadow formed on the light extractor 40 or frame member 60. Also, for shape change, it is possible, for example, to use a drive mechanism such as a motor to unfold an intended member in a folded state or fold the intended member in an unfolded state.

In the above lighting devices, the light emitter 20 is not limited to the diffuser 20 as described above that emits scattered light produced by Rayleigh scattering, and is also not limited to one that emits scattered light simulating the sky. That is, the first light emitted by the light emitter 20 is not limited to scattered light produced by Rayleigh scattering, and is also not limited to scattered light simulating the sky. For example, the first light may be light simulating light such as light reflected on the surface of water or sunlight filtered through leaves. In the present disclosure, the first light is not particularly limited as long as it includes light simulating light (also referred to below as natural light) produced from sunlight in nature. The first light may be, for example, light including natural light and artificially produced light. By arranging a light emitter that emits such first light and a frame member to be described later in a predetermined positional relationship, it is possible to provide a space including a natural view, thus improving the spaciousness of a space.

Thus, although the specific configuration of the light emitter 20 is not limited, examples of the light emitter 20 include a light guiding panel that is a light transmissive member that diffuses light by transmitting, reflecting, and guiding the light, a liquid crystal panel using a liquid crystal and a backlight, and an organic electroluminescence (EL) panel. Also, preferred examples of the light emitter 20 include a diffuser as described above that reproduces the color (i.e., a transparent blue color or the like) of a natural sky, such as a blue sky, by using a diffusing material as described above that exhibits, to incident light, Rayleigh scattering or a scattering power similar thereto. However, as already described, the light emitter 20 is not limited to any of the above examples as long as it can emit desired first light through the main light emitting surface.

Also, the frame member 60 is not limited to any of the above examples. For example, it is possible to use, as the frame member 60, a frame forming part described in PCT application PCT/JP2019/020917 by the present applicant.

Hereinafter, the light extractors 40, light deflector and frame member 60 that emit light simulating sunlight in a particular direction may be referred to simply as light extractors or sunlight extractors without particularly distinguishing them from each other.

Second Embodiment

Next, an air conditioner according to a second embodiment will be described with reference to the drawings. The air conditioner of the present embodiment includes, in addition to a configuration of a so-called air conditioner (typical air conditioner), elements of a lighting device as described above, thereby providing an air conditioner with a lighting function.

Figure 18:
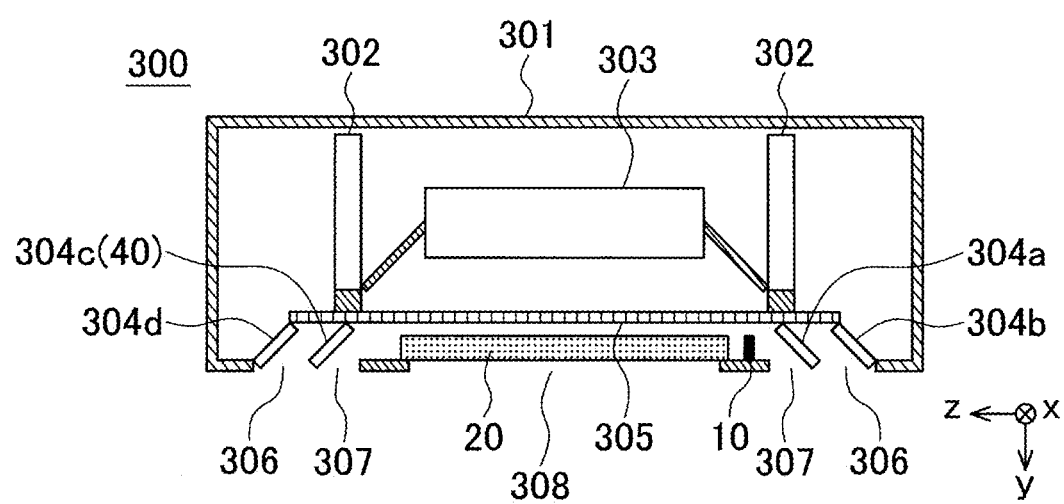
FIG. 18 is a cross-sectional view illustrating an example of a configuration of an air conditioner according to a second embodiment.

FIG. 18 is a cross-sectional view illustrating an example of a configuration of the air conditioner according to the second embodiment. An air conditioner 300 illustrated in FIG. 18 is one obtained by incorporating a light emitter and one or more light sources 10 as described above into a ceiling-embedded type air conditioner. As illustrated in FIG. 18, the air conditioner 300 includes, in a housing 301 including an inlet 306, an outlet 307, and an illumination opening 308, a heat exchanger 302, a blower 303, one or more flaps 304 provided in an airflow path connecting the inlet 306 and outlet 307, a filter 305, the light emitter 20, and the light source(s) 10. In the air conditioner 300 of this embodiment, the flap(s) 304 are rotatably held by the housing 301 and form part of the airflow path.

The inlet 306 is provided, for example, in a lower portion of the housing 301, i.e., a lower surface that is seen as a ceiling panel by an observer after the installation. The inlet 306 need not necessarily be located in the lower portion of the housing 301, and may be provided, for example, in a side plate of the housing 301 (see the example of FIGS. 20A and 20B). In this case, a second inlet that sucks indoor air into a space behind the ceiling may be provided in a ceiling surface away from the air conditioner 300.

The filter 305 and heat exchanger 302 are disposed beyond the inlet 306. For example, when a main body of the air conditioner has a substantially rectangular shape and the inlet 306 is formed along four side surfaces forming the rectangular shape, the heat exchanger 302 may be disposed in a substantially rectangular shape to correspond to the four side surfaces.

The filter 305 and heat exchanger 302 are not limited to the example in the drawing as long as they are disposed before the blower 303 in a flow path (referred to below simply as an airflow path) of air sucked in through the inlet 306.

When the air conditioner 300 is operated, the blower 303 starts, and indoor air in a room flows into the housing 301 through the inlet 306. The air flowing into the housing 301 passes through an airflow path formed by flaps 304a and 304b and enters the heat exchanger 302 through the filter 305. Upon entering the heat exchanger 302, the air is subjected to heat exchange by the heat exchanger 302, then taken into the blower 303, and blown into the room through the outlet 307. Then, after air-conditioning the room, the air is sucked into the housing 301 through the inlet 306 again, and circulates.

Also, in this example, the illumination opening 308 is provided in a lower portion of the housing 301, i.e., a lower surface panel that faces toward the room after the installation, and the light emitter 20 is disposed so that the main light emitting surface is located at a position of the illumination opening 308. The illumination opening 308 may be provided, for example, in a central portion of the lower surface panel of the air conditioner. The above light emitter 20 is provided to cover the illumination opening 308. More specifically, in the air conditioner 300, the light emitter 20 is located in a region surrounded by the outlet 307 in a lower portion of the air conditioner 300 so that the main light emitting surface or main light emitting region is viewable. The light source(s) 10 are provided at position(s) facing the light incident surface of the light emitter 20. In the example illustrated in FIG. 18, the light source(s) 10 are provided at position(s) facing at least one side surface of the light emitter 20.

Moreover, in the air conditioner 300 of this example, one of the flap(s) 304 forming part of the airflow path connecting the inlet 306 and outlet 307 is provided with the function of the light extractor 40 as described above. In this example, it can be said that a light extractor 40 is disposed on the airflow path of the ceiling-embedded type air conditioner 300. A typical air conditioner includes, in addition to a heat exchanger and a blower, near an inlet 306 and an outlet 307 on an airflow path, a flap that controls the flow (wind direction) of air flowing in or out, and a drive mechanism that drives it. The air conditioner 300 of this example includes, in addition to the configuration of such a typical air conditioner, the light emitter 20 and light source(s) 10.

In the example illustrated in FIG. 18, two flaps are provided in an outward direction along the shape of the ceiling panel of the air conditioner 300 in such a manner as to define the inlet 306 and outlet 307 in the airflow path. In this example, at least one of the flaps is used as a light extractor 40 (sunlight extractor). More specifically, a flap 304c located closest to a side surface opposite a side surface of the light emitter 20 at which the light source(s) 10 are provided is used as a light extractor 40.

In this example, light emitted through the second light emission portion 27 of the light emitter 20 is emitted in a particular direction (in this example, into a room space that is a space facing the main light emitting surface of the light emitter 20) by the flap 304c, which functions also as a light extractor 40. Moreover, in this example, it is possible to change an angle of the flap 304c by means of a flap drive mechanism (not illustrated) provided in the air conditioner 300. Thereby, it is possible to control an emission direction of light Lo together with the wind direction.

Figure 19A:
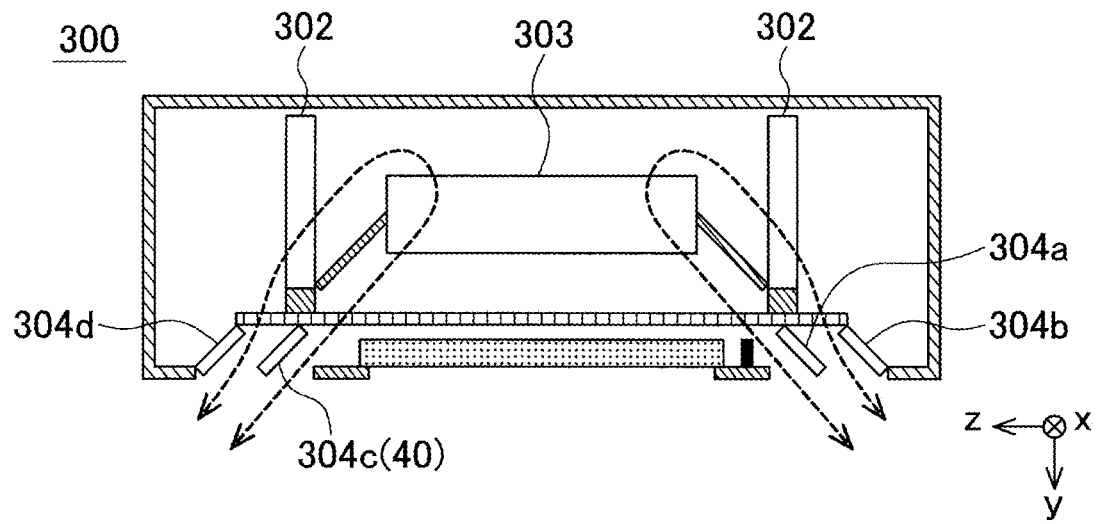
FIGS. 19A and 19B are explanatory diagrams illustrating an example of an airflow path and an optical path in the air conditioner according to the second embodiment.
Figure 19B:
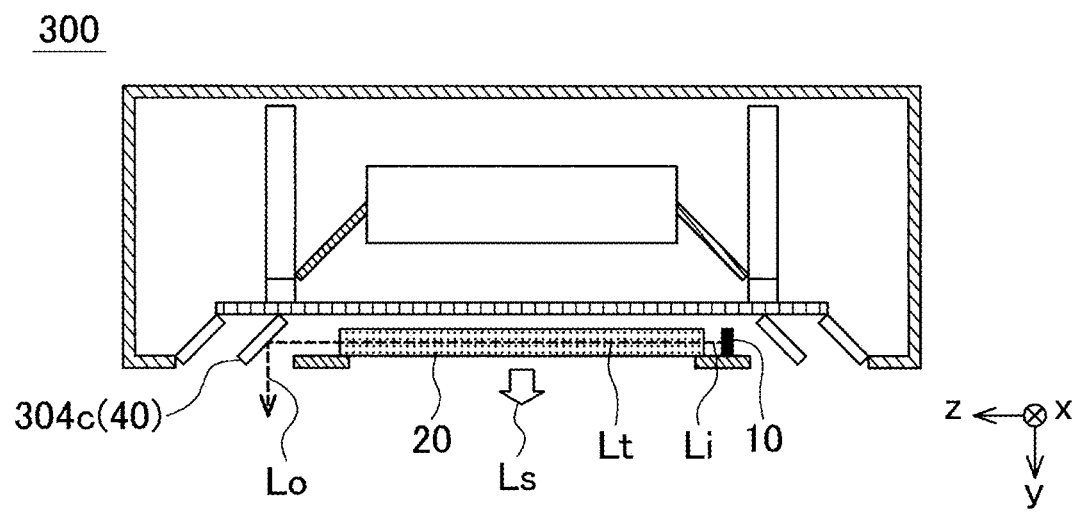

FIGS. 19A and 19B illustrate an example of the airflow path and an optical path of the air conditioner 300. FIG. 19A illustrates an example of an airflow in the air conditioner 300, and FIG. 19B illustrates an example of light emitted from the air conditioner 300.

In the example illustrated in FIG. 18, of the openings serving as the ends of the airflow path, one opening closer to the center is illustrated as the outlet 307, and the other opening farther from the center is illustrated as the inlet 306. However, as illustrated in FIG. 19A, which of the two regions defined by the two flaps is used as the outlet side or inlet side is not particularly limited. For example, it is possible that the opening closer to the center is used as the inlet 306, and the opening farther from the center is used as the outlet 307. Also, it is possible to determine which is used as the outlet side or inlet side, depending on a blowing direction of the blower 303.

Also, as illustrated in FIG. 19B, in this example, light Li emitted from the light source(s) 10, which are provided in the housing 301, enters the light emitter 20, which is also provided in the housing 301. When light Li enters the light emitter 20, the light emitter 20 guides it as light Lt. While guiding light Lt, the light emitter 20 emits light Ls generated from light Lt, through the main light emitting surface (in the example of the drawing, the lower surface). Also, the light emitter 20 emits, as light Lo, light Lt reaching the opposite end portion without becoming light Ls. Light Lo emitted from the light emitter 20 is deflected by the flap 304c used as a light extractor 40 to become light traveling toward the room.

Figure 20A:
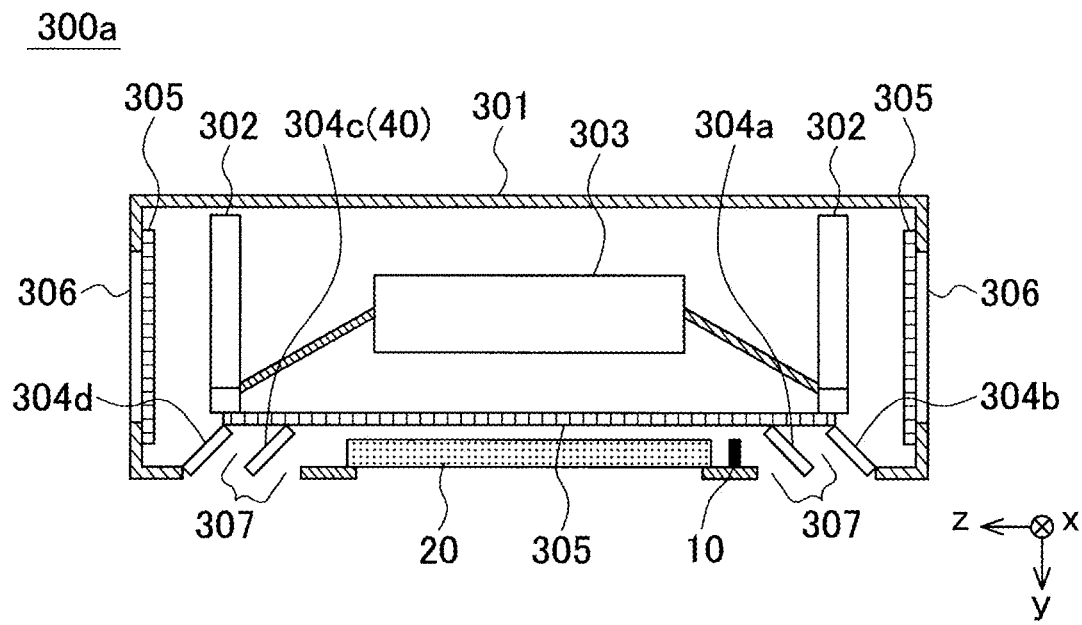
FIGS. 20A and 20B are cross-sectional views illustrating another example of the air conditioner according to the second embodiment.
Figure 20B:
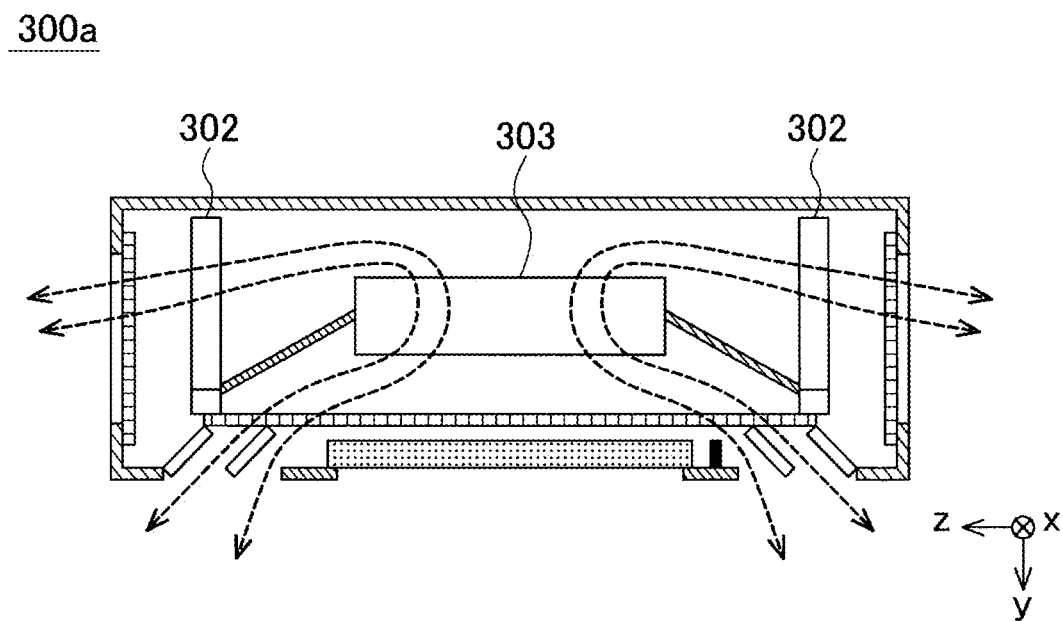

Also, FIGS. 20A and 20B are cross-sectional views illustrating another configuration example of the inlet 306 and outlet 307 of the air conditioner 300. In an air conditioner 300a illustrated in FIGS. 20A and 20B, the inlet 306 is provided in a side plate of the housing 301. In the example illustrated in FIGS. 20A and 20B, two flaps 304 arranged in an outward direction are provided in an airflow path connected to the outlet 307. However, only one flap may be provided for one side. Thus, in the air conditioner with a lighting function of the present embodiment, the position of the inlet 306 and the number of the flap(s) 304 are not particularly limited.

Figure 21:
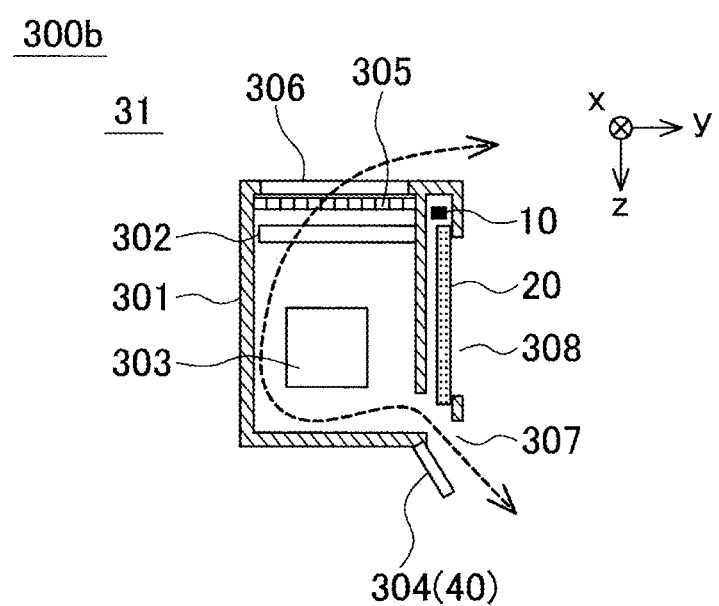
FIG. 21 is a cross-sectional view illustrating another example of the air conditioner according to the second embodiment.

Also, FIG. 21 is a cross-sectional view illustrating another example of the air conditioner according to the present embodiment. An air conditioner 300b illustrated in FIG. 21 is an example in which a light emitter 20 and one or more light sources 10 are incorporated in an indoor unit of a wall-installed type air conditioner. Also in this example, the basic configuration as an air conditioner is not particularly limited, and known ones can be used. For example, although the illustration is omitted, the air conditioner 300b may include an outdoor unit in addition to the indoor unit 31.

In the air conditioner 300b illustrated in FIG. 21, an inlet 306 is provided, for example, in an upper portion of the indoor unit 31, i.e., an upper surface that faces a ceiling after the installation. Also, an illumination opening 308 may be provided, for example, in a front portion of the indoor unit 31, i.e., a front surface that faces toward a room in an installed state. The illumination opening 308 should be provided at a position viewable by a user in an installed state, and may be provided at a position other than the front surface. Also, an outlet 307 may be provided, for example, in a lower portion of a housing 301, more specifically, a lower surface or a lower end of the front surface of the indoor unit 31. It may be basically the same as the ceiling-embedded type air conditioners 300 and 300a except that an installation direction of the light emitter 20 is different. In the example illustrated in FIG. 21, only one flap 304 is provided in the lower portion of the indoor unit 31. However, two or more flaps 304 may be provided. In this case, multiple flaps 304 may be provided along the shape of a front panel of the indoor unit 31 in such a manner as to surround the light emitter 20. In this case, for one side, two or more flaps 304 may be provided in an outward direction.

The air conditioner 300 includes the light emitter 20 and flap(s) 304 as described above. Thereby, more natural light and wind can be felt. Also, by using, as the light emitter 20, an edge-lit type light emitter such as the above diffuser 20, it is possible to easily embed it in a panel on a viewing side without increasing the size of the air conditioner and without interfering with the original air conditioning function.

<First Modification>

Figure 22A:
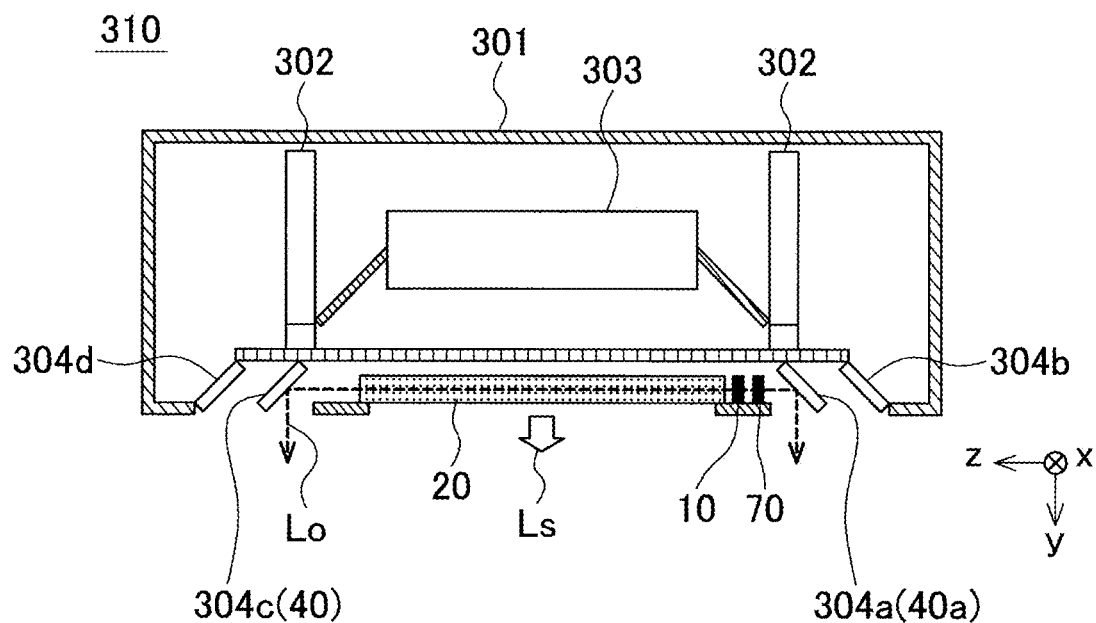
FIGS. 22A and 22B are cross-sectional views illustrating a modification of the air conditioner according to the second embodiment.
Figure 22B:
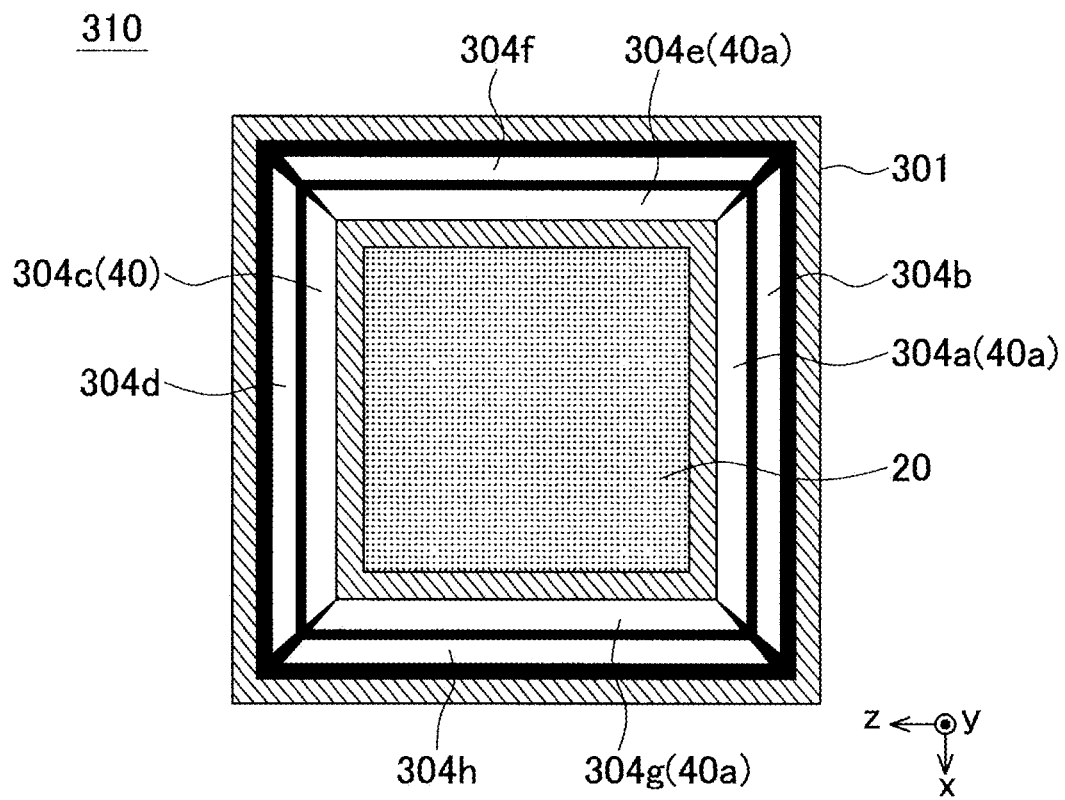

FIGS. 22A and 22B are explanatory diagrams illustrating a first modification of the air conditioner 300. FIG. 22A is a cross-sectional view illustrating a configuration example of an air conditioner 310 as the first modification of the air conditioner 300, and FIG. 22B is a view of the air conditioner 310 as viewed from a viewing side. The air conditioner 310 illustrated in FIGS. 22A and 22B further includes one or more frame light sources 70 that emit light toward one or more flaps 304 provided near edge portion(s) of the light emitter 20 at which the second light emission portion 27 is not provided.

Light emitting surface(s) of the frame light source(s) 40 face the flap(s) 304. Thereby, the flap(s) 304 provided around the edge portion(s) of the light emitter 20 at which the second light emission portion 27 is not provided are used as second light extractor(s) 40a. For example, when the main light emitting region 501 is polygonal and flaps 304 are provided to surround the main light emitting region 501, the frame light source(s) 70 may be provided along all the sides (excluding a side corresponding to an edge portion at which the second light emission portion 27 is provided) of the main light emitting region 501. For example, in the example of the drawing, frame light source(s) 70 that emit light toward flaps 304a, 304e, and 304g may be provided. Thereby, the flaps 304a, 304e, and 304g can be used as second light extractors 40a (sunlight extractors).

In the example illustrated in FIGS. 22A and 22B, the main light emitting region 501 is polygonal and the flaps 304 are provided to surround the main light emitting region 501. However, for example, in cases such as when the main light emitting region 501 is rectangular and flap(s) 304 are provided only along a subset, such as two opposite sides, of the sides of the main light emitting region 501, the frame light source(s) 70 need not necessarily be provided along all the sides of the main light emitting region 501. Thus, the frame light source(s) 70 should be provided to flap(s) 304 on which no light from the second light emission portion 27 of the light emitter 20 is incident, out of the flap(s) 304 located near the main light emitting region 501. This does not apply to flaps 304 that are not used for sunlight representation.

In the air conditioner 310 illustrated in FIGS. 22A and 22B, light emitted by the frame light source(s) 70 is deflected by the flaps 304 used as second light extractors 40a to become light traveling toward the room. Thus, since sunlight extractors can be provided to two or more sides of the light emitter 20, it is possible to make an observer feel more natural light and wind. As an example, it is possible to make flaps 304 surrounding the light emitter 20 look as if they were window frames illuminated by sunlight from the sun. Also, since the amount of light traveling toward the room can be increased, sufficient brightness as a lighting device can be held.

Also, it is possible to provide each flap 304 serving as a light extractor 40 or second light extractor 40a with a light diffusing function similar to those of the light extractor 40 and second light extractor 40a.

Although the illustration is omitted, also in the air conditioner, as with the light extractor 40 and second light extractor 40a in the lighting device, one or more light limiters 80 may be provided on optical paths before light reaches the respective flaps 304 serving as a light extractor 40 or second light extractor 40a (more specifically, between the light emitter 20 and the flap 304c serving as a light extractor 40, or between the frame light source(s) 70 and the flap 304a, 304e, or 304g serving as a second light extractor 40a).

Here, the light limiter(s) 80 may be fixed on the above optical paths, or may be rotatably or displaceably held on the above optical paths. In the latter case, the air conditioner may further include a drive mechanism for the light limiter(s) 80. For example, by changing position(s), shape(s), or angle(s) of the light limiter(s) 80 with the drive mechanism, it is possible to change, with time, the projection pattern(s) of the shadow(s).

Alternatively, the light limiter(s) 80 may be swung by using air flowing through the airflow path. For example, multiple mirrors held by plate springs may be disposed as the light limiter(s) 80. The plate springs or mirrors swing by receiving wind from the blower 303, thereby changing the projection patterns onto the light extractor 40 (in this example, the flap 304c) and the second light extractor(s) (in this example, the flap 304a).

By swinging not only the flaps 304 used as a light extractor 40 and second light extractor(s) 40a but also the light limiter(s) 80, it is possible to make an observer feel as if sunlight filtered through leaves were coming in. Also, the projection patterns are changed by wind, so that the wind can be visually perceived.

<Second Modification>

Figure 23:
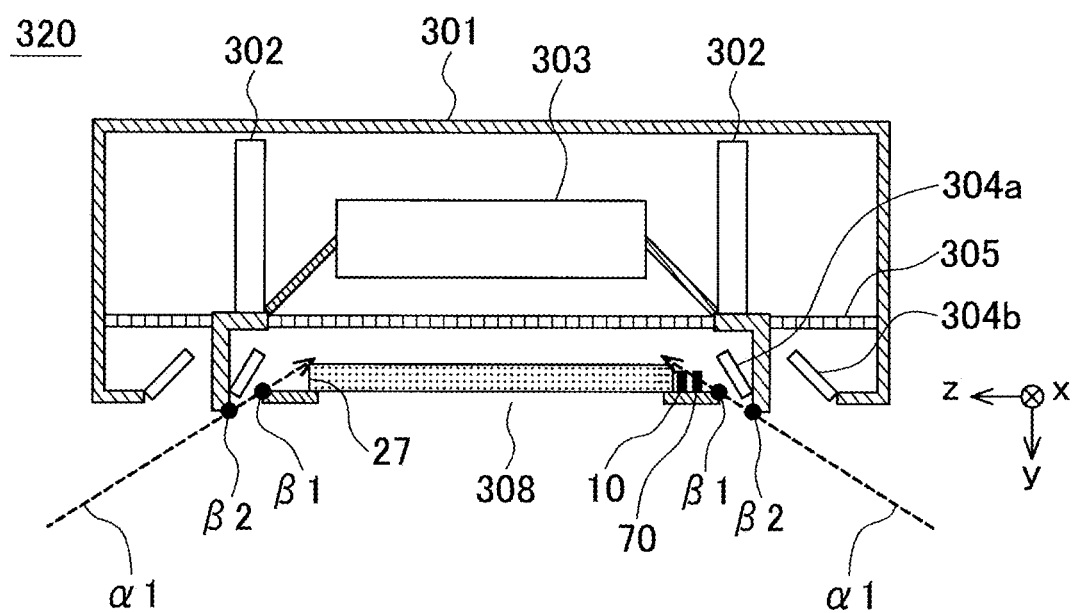
FIG. 23 is a cross-sectional view illustrating a modification of the air conditioner according to the second embodiment.

FIG. 23 is a cross-sectional view illustrating a further modification of the air conditioner according to the present embodiment. In an air conditioner 320 illustrated in FIG. 23, the light source(s) 10, the frame light source(s) 70, and an edge surface of the light emitter 20 are disposed so that they are not visible from the room. More specifically, in the air conditioner 320, the openings of the housing 301, the light source(s) 10, the frame light source(s) 70, and the edge surface(s) (in particular, the second light emission portion 27) of the light emitter 20 are disposed so that the light source(s) 10, the frame light source(s) 70, and the second light emission portion 27 of the light emitter 20 are not located on a straight line in a line-of-sight direction in the case of looking into the housing 301 through an opening of the airflow path that is defined by the housing 301 and is closest to the light emitter 20. The line-of-sight direction at this time may be, for example, a direction ($\alpha 1$ in the drawing) that is maximally directed at a center in the case of looking into the housing 301 through the above opening of the airflow path. The line-of-sight direction al may be a straight line connecting an edge portion $\beta 2$ of the housing 301 that defines a lower end of an inner peripheral surface on the outer periphery side of the opening of the airflow path closest to the light emitter 20 and an edge portion $\beta 1$ of the housing 301 that defines an upper end of an inner peripheral surface on the inner periphery side of the opening.

In this manner, the light source(s) 10, frame light source(s) 70, and the edge surface(s) of the light emitter 20 are arranged in view of the line-of-sight direction. Thereby, more natural light and wind can be felt.

Although the present embodiment describes an example in which a lighting function is incorporated into an air conditioner including a heat exchanger, the air conditioner into which a lighting function is incorporated may be a so-called blower that only blows air without performing heat exchange. Even such a blower is referred to as an air conditioner in the present disclosure.

Also, although the illustration is omitted, the lighting device and the air conditioner with a lighting function according to the present disclosure may include a controller that controls the light emission states (on/off and/or emitted light color) of the light emitter 20 and the sunlight extractor(s) provided therearound.

The controller may include, for example, a first light source driver that turns on, dims, or turns off the light source(s) 10 and a second light source driver that turns on, dims, or turns off the frame light source(s) (or auxiliary light source(s)). The first light source driver and second light source driver may perform the controls in cooperation with each other, or may perform the controls independently of each other.

An example of the control of the emitted light colors of the light emitter 20 and sunlight extractor(s) by the controller will be described below. When it is assumed that the light emitter 20 is a lighting panel that simulates a blue sky in fair weather seen through a window, it is preferable that the bright region(s) 401 can simulate sunny region(s) of a window frame in fair weather and the dark region(s) 402 can simulate shaded region(s) of the window frame in fair weather. In such a case, it is easy to imagine that while the bright region(s) 401, i.e., simulated sunny region(s), in a turned-on state are brighter than the light emitter 20 in a turned-on state, the light (second light) simulating sunlight emitted from the bright region(s) 401 has a lower color temperature than the light (first light) simulating a blue sky emitted from the main light emitting surface of the light emitter 20. For example, the luminance of a blue sky in fair weather is about 5000 cd/m$^2$, and the luminance of a sunny region on a white diffuse reflecting surface commonly used in window frame members is about 30000 cd/m$^2$. Also, the color temperature of light from a blue sky in fair weather is about 20000 K, and the color temperature of light from a sunny region on a white diffuse reflecting surface is about 5000 K. Thus, it is preferable that the magnitude relationships in luminance and emitted light color temperature between the main light emitting surface or main light emitting region of the light emitter 20 and the bright region(s) 401 of the sunlight extractor(s) be maintained as described above. However, when the sky seen through a window includes not only a blue sky in fair weather but also a sky in rainy weather or a sky in cloudy weather or both of them, it is more preferable that the ratio in luminance (or emitted luminous flux) between the main light emitting surface or main light emitting region of the light emitter 20 and the bright region(s) 401 of the sunlight extractor(s) be in the range of 20:1 to 1:30.

For example, the luminance of the main light emitting surface or main light emitting region of the light emitter 20 in a turned-on state may be 100 to 6000 cd/m$^2$, and more preferably 500 to 3000 cd/m$^2$. On the other hand, the luminance of the bright region(s) 401 of the sunlight extractor(s) in a turned-on state may be 300 to 30000 cd/m$^2$, and more preferably 1000 to 12000 cd/m$^2$. Also, the correlated color temperature of the first light emitted from the light emitter 20 may be 10000 to 100000 K, and more preferably 20000 to 80000 K. On the other hand, the correlated color temperature of the second light emitted from the bright region(s) 401 may be 2000 to 7000 K, and more preferably 2500 to 6500 K.

Also, the difference in correlated color temperature between the first light emitted by the light emitter 20 and the second light emitted by the bright region(s) 401 of the sunlight extractor(s) may be not less than 20000 K and not more than 98000 K.

Moreover, when the sunlight extractor(s) include the dark region(s) 402, the ratio in luminance (or luminous flux) between the bright region(s) 401 and the dark region(s) 402 in a turned-on state is preferably in the range of 100:1 to 20:1, and more preferably about 10:1. However, this relationship is a condition met in fair weather, and does not apply to conditions such as cloudy weather or night.

The controller may be provided at a location different from that of a main body of the lighting device or air conditioner. For example, an external server may include the controller. In this case, the main body of the lighting device or air conditioner and the server including the controller are connected to each other through a network. For example, it is possible that, in a control system that controls multiple air conditioners in a building or the like, a lighting function is incorporated in each air conditioner, and a controller provided in the control system performs control of the air conditioning functions and control of the lighting functions. Also, it is possible that, in a control system that controls multiple lighting devices, a pair of a light emitter 20 and light extractor(s) as described above is provided in each lighting device, and a controller provided in the control system performs control of the light emission states of the light emitters 20 and control of the light emission states of the light extractors.

REFERENCE SIGNS LIST 100 lighting unit
10 light source
12 substrate
13 LED element (light emitting element)
20 diffuser (light emitter)
24 light incident portion
25 light guiding portion
26 first light emission portion
27 second light emission portion
201 base material
202 particle
30 back plate
40 light extractor
50 light deflector
60 frame member
70 frame light source
501 main light emitting region
200, 200a, 210, 220, 220a, 220b lighting device
300, 300a, 300b, 310, 320 air conditioner
31 indoor unit
301 housing
302 heat exchanger
303 blower
304a to 304h flap
305 filter
306 inlet
307 outlet
308 illumination opening
500 frame

The invention claimed is:

1. A lighting device comprising: a first light source; a light emitter including a light incident portion on a first edge portion to receive light emitted from the first light source and a first light emission portion on a surface of the light emitter to emit first light generated from the light and including light simulating natural light; at least one light extractor provided at a second edge portion of the light emitter that is opposite to the first edge portion of the light emitter, the at least one light extractor deflecting second light that is a part of the light received by the light emitter that reaches the second edge portion of the light emitter without being emitted as the first light toward a space that faces the surface of the light emitter in which the first light emission portion is formed; and a light limiter provided on an optical path before the second light reaching the at least one light extractor, the light limiter reducing the second light received by the at least one light extractor.

2. The lighting device of claim 1, wherein a shadow of the light limiter is projected to the at least one light extractor.

3. The lighting device of claim 1, further comprising a drive mechanism to change a position, an angle, or a shape of the at least one light extractor.

4. The lighting device of claim 1, further comprising the second light source to emit the second light toward the at least one light extractor, the second light having a color temperature different from a color temperature of the first light.

5. The lighting device of claim 1, wherein a ratio between a luminous flux of the first light emitted from the first light emission portion of the light emitter and a luminous flux of the second light deflected by the at least one light extractor is in a range of 20:1 to 1:30.

6. The lighting device of claim 1, wherein the at least one light extractor includes a bright region and a dark region, wherein the light limiter reduces the second light emitted from the second edge portion to form the bright region and the dark region, and wherein the light limiter is disposed in the dark region or a region corresponding to the dark region on an optical path before the second light emitted from the second edge portion is incident on an incident surface of the at least one light extractor and deflected as light traveling toward the space from the surface of the at least one light extractor.

7. The lighting device of claim 6, wherein a ratio in luminance between the bright region and the dark region is in a region of 100:1 to 20:1.

8. The lighting device of claim 2, further comprising a drive mechanism to change a position, an angle, or a shape of the light limiter.

9. The lighting device of claim 6, further comprising a drive mechanism to change a position, an angle, or a shape of the light limiter.

10. A control system comprising:
the lighting device of claim 1; and
a controller to control light emission states of the light emitter and the at least one light extractor of the lighting device.

11. A lighting device comprising:
a first light source;
a light emitter including a light incident portion to receive light emitted from the first light source and a first light emission portion to emit first light generated from the light and including light simulating natural light;
at least one light extractor provided at at least one position in an edge portion of the light emitter or around the light emitter, the at least one light extractor deflecting second light that is part of the light received by the light emitter that reaches an edge portion of the light emitter without being emitted as the first light toward a space that faces a surface of the light emitter in which the first light emission portion is formed; and
a light limiter provided on an optical path before the second light reaching the at least one light extractor, the light limiter reducing the second light received by the at least one light extractor.

12. The lighting device of claim 11, wherein a shadow of the light limiter is projected to the at least one light extractor.

13. The lighting device of claim 11, wherein the second light has a color temperature different from a color temperature of the first light.

14. The lighting device of claim 11, wherein
the light emitter includes a second light emission portion to emit the second light that is part of the light received by the light emitter that reaches the edge portion of the light emitter without being emitted as the first light,
the at least one light extractor includes a bright region and a dark region, and
the light limiter is disposed in the dark region or a region corresponding to the dark region on an optical path before the second light emitted from the second light emission portion is incident on an incident surface of the at least one light extractor and emitted as light traveling toward the space from an emission surface of the at least one light extractor.

15. A lighting device comprising:
a first light source;
a light emitter including a light incident portion to receive light emitted from the first light source and a first light emission portion to emit first light generated from the light and including light simulating natural light; and
at least one light extractor provided at at least one position in an edge portion of the light emitter or around the light emitter, the at least one light extractor deflecting second light that is a part of the light received by the light emitter that reaches an edge portion of the light emitter without being emitted as the first light or second light received from the first light source or a second light source different from the first light source without intervention of the light emitter, toward a space that faces a surface of the light emitter in which the first light emission portion is formed, and
a light limiter provided on an optical path before the second light reaching the at least one light extractor, the light limiter reducing the second light received by the at least one light extractor,
wherein a shadow of the light limiter is projected to the at least one light extractor.

* * * * *